United States Patent [19]
Yamada et al.

[11] Patent Number: 5,517,242
[45] Date of Patent: May 14, 1996

[54] IMAGE SENSING DEVICE HAVING EXPANDED DYNAMIC RANGE

[75] Inventors: Keiichi Yamada, Aichi; Tomoaki Nakano; Shin Yamamoto, both of Nagoya, all of Japan

[73] Assignee: Kabushiki Kaisha Toyota Chuo Kenkyusho, Aichi, Japan

[21] Appl. No.: 267,674

[22] Filed: Jun. 29, 1994

[30] Foreign Application Priority Data

Jun. 29, 1993 [JP] Japan .................................. 5-186889
Jun. 30, 1993 [JP] Japan .................................. 5-188983

[51] Int. Cl.$^6$ .................................................. H04N 5/235
[52] U.S. Cl. ............................. 348/254; 348/28; 348/229
[58] Field of Search ................................ 348/25, 28, 222, 348/221, 229, 254, 255, 674, 678; H04N 5/235

[56] References Cited

U.S. PATENT DOCUMENTS

| | | | |
|---|---|---|---|
| 4,187,519 | 2/1980 | Vitols et al. | 348/28 |
| 4,647,975 | 3/1987 | Alston et al. | 348/222 |
| 5,144,442 | 9/1992 | Ginosaur et al. | 348/222 |
| 5,162,914 | 11/1992 | Takahashi et al. | 348/229 |
| 5,309,243 | 5/1994 | Tsai | 348/229 |

FOREIGN PATENT DOCUMENTS

| | | | |
|---|---|---|---|
| 57-212448 | 12/1982 | Japan | H04N 1/46 |
| 60-52171 | 3/1985 | Japan | H04N 5/335 |
| 60-52172 | 3/1985 | Japan | H04N 5/335 |
| 62-108678 | 5/1987 | Japan | H04N 5/335 |
| 199036 | 4/1989 | Japan | H04N 1/04 |
| 2100564 | 4/1990 | Japan | H04N 1/04 |
| 5316413 | 11/1993 | Japan | H04N 5/235 |

OTHER PUBLICATIONS

Rangaraj M. Rangayyan, et al., Expanding the Dynamic Range of X–Ray Videodensitometry Using Ordinary Image Digitizing Devices, Sep. 15, 1984, vol. 23, No. 18, Applied Optics, pp. 3117–3120.

*Primary Examiner*—James J. Groody
*Assistant Examiner*—Jeffrey S. Murrell
*Attorney, Agent, or Firm*—Oblon, Spivak, McClelland, Maier & Neustadt

[57] ABSTRACT

An image sensing device is provided with an expanded dynamic range when it photographs a moving object. A first gray value D1 of first picture taken with first exposure time is read in the first time interval and a second gray value D2 of second picture taken with second exposure time is read in the second time interval. Two function values f(D2) and g(D2) are calculated with respect to the second gray value D2. Then, a weight coefficient with respect to the function f(D2) is multiplied by the first gray value D1 and a weight coefficient with respect to the function g(D2) is multiplied by the second gray value D2. Those multiplied gray values are summed up. Such calculation of multiplying and summing up is carried out in each picture element of the first picture and the second picture, respectively.

9 Claims, 33 Drawing Sheets

F I G. 4
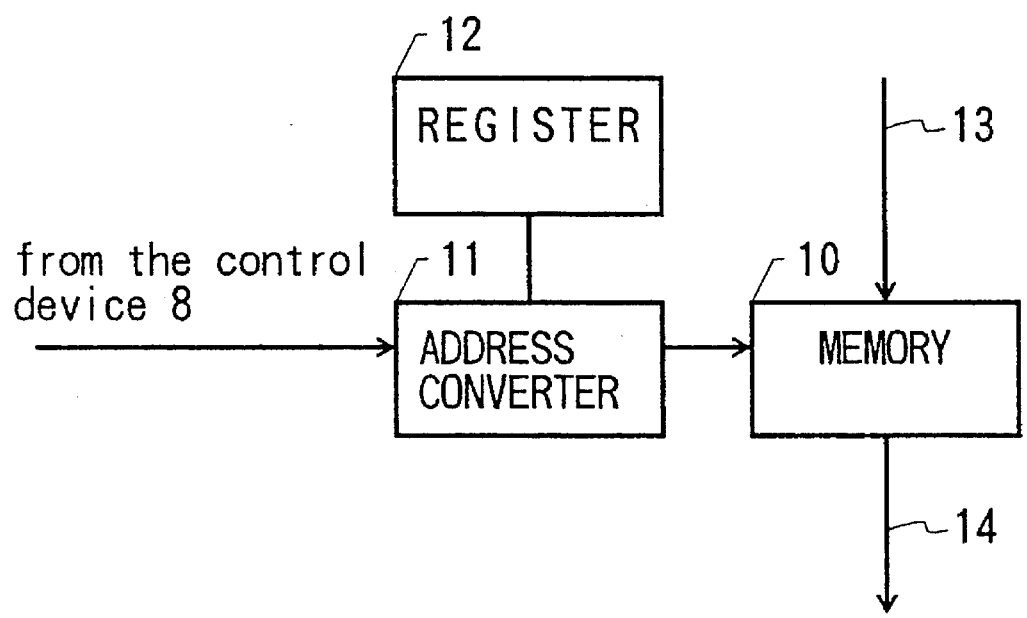

F I G. 2 2 (i)
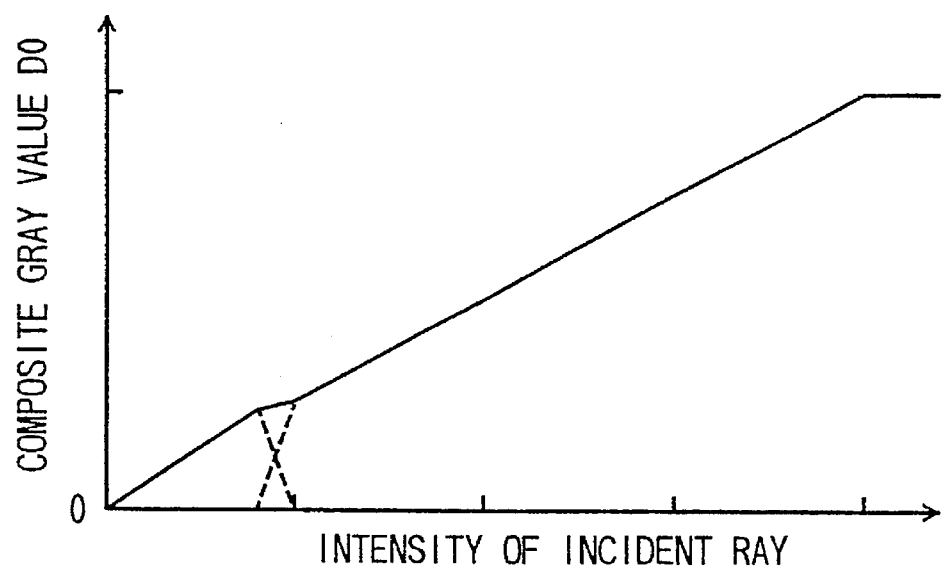
F I G. 2 2 (j)
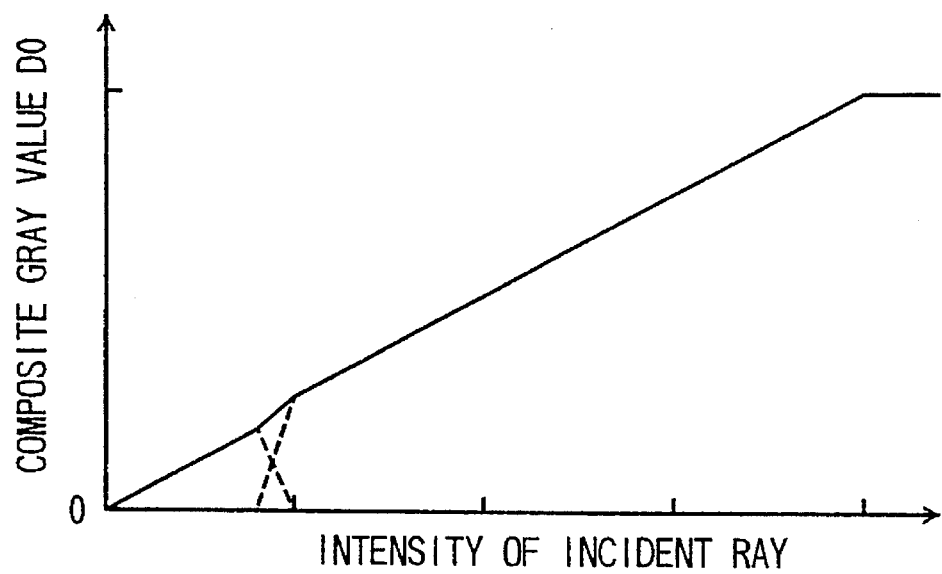

POSITION OF PICTURE ELEMENT

POSITION OF PICTURE ELEMENT $$Z = P \cdot h_1(8S) + 2Q \cdot h_2(8S) + 4R \cdot h_3(8S) + 8S \cdot h_4(8S)$$

IMAGE SENSING DEVICE HAVING EXPANDED DYNAMIC RANGE

BACKGROUND OF THE INVENTION

1. Field of the Invention

The present invention relates to an image sensing device such as a video camera, an electronic camera and so on, in which the dynamic range of an image sensing element is expanded.

2. Description of the Prior Art

In general, the dynamic range of an image sensing element is decided by the proportion of a noise level to a saturation level in an output signal. It has been well-known in the art that a device to control an exposure to an image sensing element, such as a controller of intensity of illumination, amount of diaphragm, shutter speed, transparency of film and so on, enables one to obtain a plurality of pictures with different exposures from an object, combine the plural pictures, and obtain a picture with a wider dynamic range than that of the image sensing element itself (Rangaraj M. Rangayyan, Richard Gordon: "Expanding the dymanic range of x-ray videodensitometry using ordinary image digitizing devices", Applied Optics, Vol. 23, No. 18, pp. 3117–3120, 1984; Japanese Laid-Open Patent Application No. Sho 57-212448; Japanese Laid-Open Patent Application No. Sho 60- 52171; Japanese Laid Open Patent Application No. Sho 60- 52172; Japanese Laid Open Patent Application No. Sho 62-108678; Japanese Laid Open Patent Application No. Hei 1-99036; and Japanese Laid Open Patent Application No. Hei 2-100564).

As a concrete example, a Japanese Laid-Open Patent Application No. Hei 4-146404 discloses a charged coupled device (CCD) with an electronic shutter. The device obtains a set of two pictures from an object taken with two different exposures, or different exposure time, T1 and T2 controlled by shutter speeds. The reference is characterized in how to combine the two pictures, first one with the exposure T1 and second one with T2, to obtain a composite picture with an expanded dynamic range. The ways to combine the two pictures are described in the following two paragraphs.

FIG. 19(a) shows a relationship between a brightness, or an intensity of incident ray, on a receiving plane of the image sensing element and its output signal. In FIG. 19(a), the zero level is denoted by 0 and is defined by the output of the image sensing device at no incident ray, neglecting a noise, and the saturation level is denoted by Dsat. It is supposed that the output keeps linearity between 0 and Dsat for the intensity of incident ray and that the exposures T1 and T2 satisfy T1<T2. D1 and D2 denote first and second gray values of the first and second pictures with the exposures T1 and T2, respectively. The gray value D1 is employed for a picture element, or pixel, in a bright area and D2 for a picture element in a dark area to obtain a composite picture with an expanded dynamic range compared with that of the image sensing element itself.

Specifically, as to each picture element, when the gray value D2 does not reach the saturation level Dsat, the gray value D2 is employed as a gray value of the picture element, and when it reaches the saturation level Dsat, the gray value D1 multiplied by a coefficient T2/T1 is employed as a gray value of the picture element. The reason for multiplying D1 by T2/Ti is to convert the first gray value D1 into a gray value corresponding to the sensitivity of the second gray value D2. Since the output signal from the image sensing element with the same intensity of incident ray is directly proportional to the exposure before it reaches the saturation level Dsat. D2 reaches to its Dsat earlier than D1 does at the same intensity of incident ray. The second gray value D2 with the exposure T2 is designed to be more sensitive than the first gray value D1. In other words, the sensitivity of D1 is T1/T2 times as high as that of D2. Therefore, the gray value D1 multiplied by T2/T1 corresponds to the gray value D2.

In some cases, however, a problem arises that discontinuity which does not inherently exist emerges on the critical part between D1 and D2 in the composite picture. This problem happens when the proportion between the sensitivity of D1 and D2 does not exactly correspond to the proportion rate T1/T2, because of the errors in the exposure and incomplete linearity of the image sensing element itself. The cause of this problem is that using D1 or D2 is critically selected in consideration of the critical point if D2 has reached the saturation level $D_{sat}$ or not.

In order to solve such a problem, Japanese Laid-Open Patent Application No. Sho 62-108678 suggests multiplying D1 and D2 by respective weight coefficients f(D1) and g(D2) as shown in FIGS. 20(a) and 20(b) and adding the both products. Accordingly, as shown in FIG. 20(c), the selection ratios of using D1 and D2 are gradually changed near the critical point, so that the selection will not be drastic.

Namely, a gray value D0 of a composite picture with an expanded dynamic range is calculated by the following equation;

$$D0=(D1 \times T2/T1) \times f(D1)+D2 \times g(D2) \qquad (1)$$

As a result, the picture with the expanded dynamic range can be obtained by gradually changing the coefficients f(D1) and g(D2) without discontinuity.

The picture with the expanded dynamic range calculated by Eq. 1 still has problems caused by the following three factors; characteristic change of camera under the influence of temperature, fluctuating intensity of illumination over the time on a picturing object, and movement of the picturing object.

The first problem is that temperature changes the characteristic of a camera affecting the relation between intensity of incident ray and an output signal of camera. Solid lines in FIG. 19(a) show their relation without any influence of temperature. However, temperature affects the relation as shown by the solid lines in FIGS. 19(b) and 19(c), which are deviated from the broken lines ignoring the influence of temperature. The deviation can be seen also in number. Gamma value of camera is 1.0 in FIG. 19(a), whereas in FIG. 19(b) and FIG. 19(c), it is 1.05 and 0.95. respectively. In the case of FIG. 19(a), when a picture with an expanded dynamic range is formed according to the above mentioned method, the relation between the composite gray value D0 and the intensity of incident ray exhibits as shown in FIG. 21(f). On the other hand, in the cases of FIGS. 19(b) and 19(c), where the characteristics of the camera are deviated from a standard characteristic, discontinuity will emerge on the lines as shown in FIGS. 21(g) and 21(h) which show relations between the composite gray value and the intensity of incident ray.

Such characteristic change of the camera causes a difference between the sensitivity ratio of D1 and D2 and the exposure ratio of D1 and D2 on a certain picture element in an unsaturated region. As a result, the relation between the weight coefficients f and g and the intensity of incident ray does not show linearity as shown by the broken line in FIG.

20(c), but fluctuates as shown by the broken lines in FIGS. 20(d) and 20(e).

Second, a problem similar to the first one arises when the pictures are taken with different exposures in order with the picturing object illuminated in fluctuating intensity over the time. A change of the intensity of incident ray causes an apparent difference between the sensitivity ratio of D1 and D2 and the exposure ratio of D1 and D2 on a certain picture element in an unsaturated region. Lines which show relations between the composite gray value D0 and the intensity of incident ray fluctuate as shown in FIG. 21(g) and FIG. 21(h), resulting in obtaining the composite picture with discontinuity.

Third, a problem similar to the first one arises when pictures of a moving object are taken with different exposures in order. Suppose movement of the picturing object causes a position shift on an image sensing element between the first picture and second picture as shown in FIG. 23(a). Such a position shift causes an apparent difference between the sensitivity ratio of D1 and D2 and the exposure ratio of D1 and D2 on a certain picture element in an unsaturated region, resulting in similar consequences to those of the first and second cases. FIG. 23(b) shows the composite picture with the expanded dynamic range in the case of FIG. 23(a), where spikes P1 and P2 emerge which do not inherently exist.

In view of these problems, it is an object of this invention to provide an image sensing device to form a picture with an expanded dynamic range in spite of a characteristic change of a camera, fluctuating illumination intensity over the time on a picturing object, and movement of the picturing object.

SUMMARY OF THE INVENTION

According to the present invention, there is provided an image sensing device to obtain a composite picture with an expanded dynamic range by combining plural pictures with different exposures comprising: at least one image sensing element which photographs an object with at least two different exposures; controlling means for changing the exposures to the image sensing element at n steps (n≧2, integer) and controlling the image sensing element to output n sets of pictures taken with said n steps of exposures; combining means for creating the composite picture with the expanded dynamic range, by combining first and second pictures taken with consecutive two exposures out of the n steps of exposures, the second picture being taken with a larger exposure than the first picture, wherein an intermediate composite picture with an intermediate expanded dynamic range is firstly created by calculating a gray value of the second picture in a saturation region thereof based on a gray value of the first picture, utilizing two gray values of the first and second pictures and two weight coefficients, the two weight coefficients being decided by the gray values of one of the first and second pictures, thereby reducing n sets of pictures to n−1 sets, and the proceeding process is repeated with respect to the n−1 sets of pictures to obtain a final composite picture with the most expanded dynamic range.

According to another aspect of the present invention, there is provided an image sensing device to obtain a composite picture with an expanded dynamic range by combining plural pictures with different exposures comprising: at least one image sensing element which photographs an object with at least two different exposures; controlling means for changing the exposures to the image sensing element at n steps (n≧2, integer) and controlling the image sensing element to output n sets of pictures taken with the n steps of exposures; product calculating means for multiplying each gray value of the n sets of pictures by each weight coefficient decided by n sets of functions with respect to a first gray value of a first picture taken with the smallest exposure, respectively; adding means for summing up the each gray value weighted by the product calculating means; and control device for controlling the product calculating means and the adding means and outputting a result of said adding means as the composite picture with the expanded dynamic range based on each of the gray value of the n sets of pictures, for each picture element corresponding to the n sets of pictures.

Here is described an example of altering exposure for four steps comprising a standard exposure, a second exposure which has twofold exposure of the standard exposure, a third exposure which has fourfold exposure of the standard exposure, and a fourth exposure which has eightfold exposure of the standard exposure. The reference characters S, R, Q, and P in FIG. 32(a) respectively show relations between the intensity of incident ray and gray values output from an image sensing element. In any cases, the range of their gray values output from the image sensing element is restricted to the gray value range Y1. Moreover, due to the noise included in the output from the image sensing element, the smaller the output therefrom is, the less accurate the gray value becomes within the range Y1. Taking a picture with the standard exposure enables the image sensing element to detect the intensity of incident ray in the ranges X1 to X4. Taking with the second exposure enables to detect the intensity of incident ray in the ranges of X1 to X3 and the picture is saturated in the range X4. Similarly, taking with the third exposure enables to detect the intensity of incident ray in the ranges of X1 and X2 and the picture is saturated in the ranges X3 and X4, not being able to be detected. Taking with the fourth exposure enables to detect the intensity of incident ray only in the range X1 and the picture is saturated in the regions X2 to X4, not being able to be detected.

Each gray value taken with each exposure is converted into the value at the sensitivity of the largest exposure. Namely, the gray values P, Q, R, and S become P, 2Q, 4R, and 8S, respectively, after conversion. The device of this invention adopts the value in a section A' for the gray value P, the value in a section B' for the gray value 2Q, the value in a section C' for the gray value 4R, and the value in a section D' for the gray value 8S in the ranges of X1, X2, X3, and X4, respectively. As a result, as shown in FIG. 32(b), a dynamic range of the gray value is expanded from Y1 to Y4 adopting the regions where the output from the image sensing element is accurate.

The device of this invention is characterized in its calculation to combine the gray values in transitional parts of each range. First, the gray values P and 2Q obtained from the adjacent exposures are combined to calculate an intermediate composite gray value Z1 with a dynamic range Y1 to Y2. At this time, the gray values P and 2Q are multiplied by the weight coefficients $g_1(P)$ and $f_1(P)$ shown in FIG. 33(a), respectively, and are summed up to smooth the intermediate composite gray value Z1 at a transitional part of regions. The weight coefficients are determined by the functions $g_1(P)$ and $f_1(P)$ with respect to a common gray value P. Namely, the gray values P and 2Q are summed depending on the characteristic change shown in FIG. 33(a) shortly before the gray value P is saturated.

The intermediate gray value Z1 is calculated by the following equation:

$$Z1 = P \times g_1(P) + 2Q \times f_1(P) \quad (2)$$

FIG. 34 shows a characteristic figure of the intermediate gray value Z1. Its dynamic range is expanded to Y1 and Y2 from only Y1.

Then, another intermediate composite gray value Z2 is calculated combining the intermediate composite gray value Z1 which is considered to be obtained from equivalently adjacent exposures and the third gray value 4R by the following equation:

$$Z2 = Z1 \times g_2(Z1) + 4R \times f_2(Z1) \qquad (3)$$

The weight coefficients $g_2(Z1)$ and $f_2(Z1)$ gradually vary according to the function as shown in FIG. 33(b). They are decided by a common variable Z1 with respect to the functions $g_2$ and $f_2$.

Similarly, a final composite gray value Z is calculated combining the intermediate composite gray value Z2 and the fourth gray value 8S by the following equation:

$$Z = Z2 \times g_3(Z2) + 8S \times f_3(Z2) \qquad (4)$$

The weight coefficients $g_3(Z2)$ and $f_3(Z2)$ gradually vary according to the function as shown in FIG. 33(c). They are decided by a common variable Z2 with respect to the functions $g_3$ and $f_3$.

As a result, a dynamic range of the final composite gray value Z is expanded to the range Y1 to Y4.

It is desirable to employ a gray value with the larger exposure as a common variable of the functions of weight coefficients, in order to reduce the effects by noise.

There is shown another way to obtain a final composite gray value Z. Here is employed with a gray value S as a common variable of the functions of weight coefficients. As shown in FIG. 35(b), each weight coefficient for each gray value is decided by overlapped functions $h_1(8S)$, $h_2(8S)$, $h_3(8S)$, and $h_4(8S)$ with each other around their transitional parts. The final composite gray value Z is obtained by the following equation:

$$Z = P \times h_1(8S) + 2Q \times h_2(8S) + 4R \times h_3(8S) + 8S \times h_4(8S) \qquad (5)$$

As stated above, in the device of this invention the weight coefficients are determined by the functions with respect to a common variable, a gray value. Therefore, a discontinuity of the combination of weight coefficients is mitigated, although there is a difference between the ratio of the gray values among the first to nth pictures and the ratio of corresponding exposures on account of characteristic changes of a camera, fluctuating intensity of illumination over the time on a picturing object, movements of an picturing object, and so on. Therefore, a composite picture with a smoothly expanded dynamic range is obtained even if there is a characteristic change in an output signal of the camera in relation to the intensity of incident ray.

BRIEF DESCRIPTION OF THE DRAWING

In the accompanying drawings:

FIG. 4 is a block diagram showing the detail constitution of the image memory of the image sensing device of FIG. 1;

FIGS. 21(f) to 21(h), 22(i), and 22 (j) are characteristic figures showing the relation between intensity of incident ray and a composite gray value;

DETAILED DESCRIPTION OF THE INVENTION

The invention will be more fully understood by reference to the following examples.

Example 1

Figure 1:
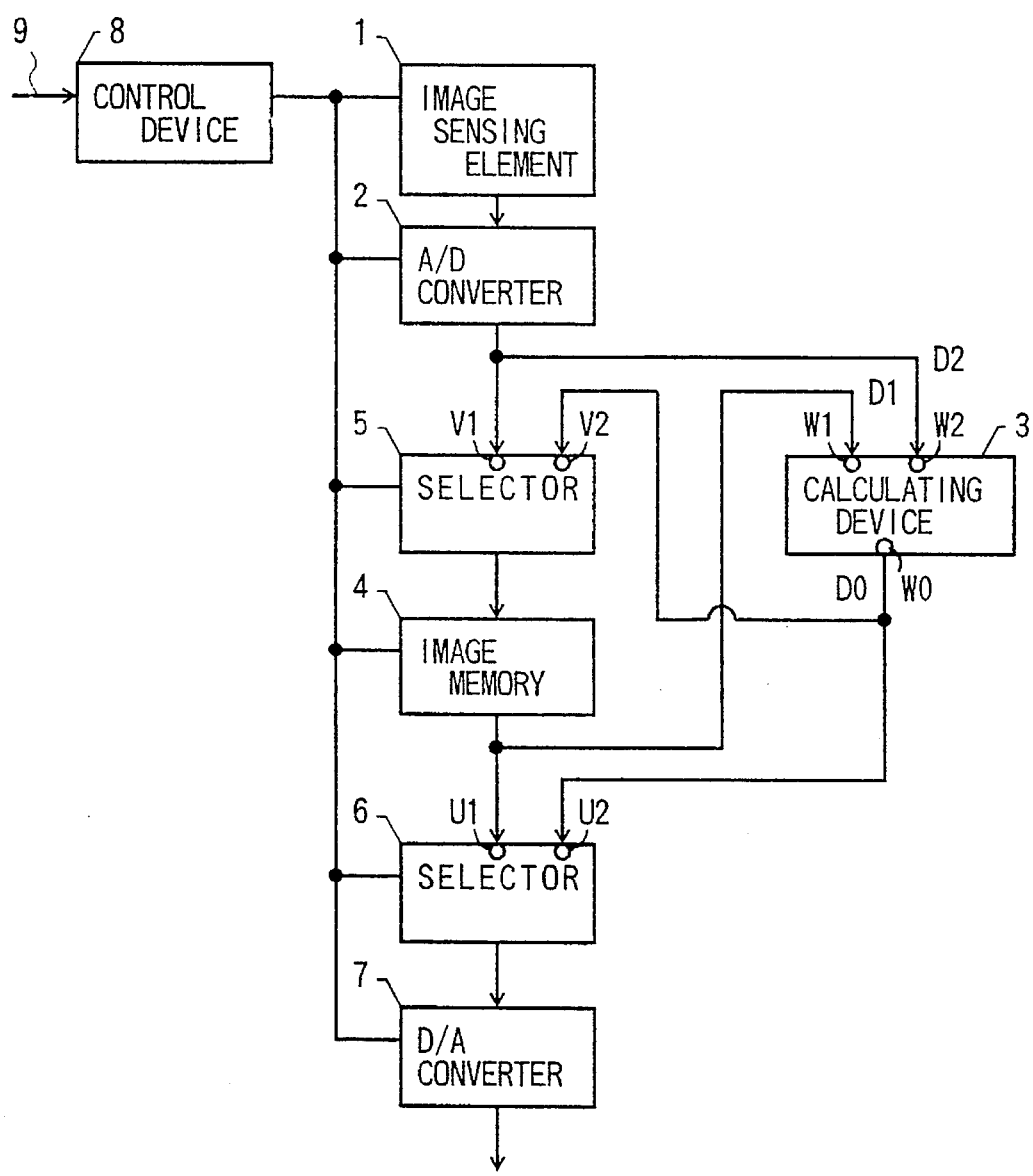
FIG. 1 is a block diagram showing the constitution of an image sensing device in the first embodiment of this invention.

Referring now to FIG. 1, there is shown a constitution of an image sensing device comprising an image sensing element 1 such as a CCD imager with an electronic shutter for picturing an object twice with different exposures, i.e. first and second exposures, and a control means 8, or image sensing control means, for controlling the image sensing element 1. An output of the image sensing element 1 is connected to an A/D converter 2. Its output is connected both to a second input terminal W2 of a calculating device 3, embodying a first calculating means and second calculating means, and to a first input terminal V1 of a selector 5. An output of the selector 5 is connected to an image memory 4. Its output is connected both to a first input terminal W1 of the calculating device 3 and to a first input terminal U1 of a selector 6. An output of the calculating device 3 is connected both to the second terminal V2 of the selector 5 and to the second input terminal U2 of the selector 6. An output of the selector 6 is connected to a D/A converter 7.

Figure 6:
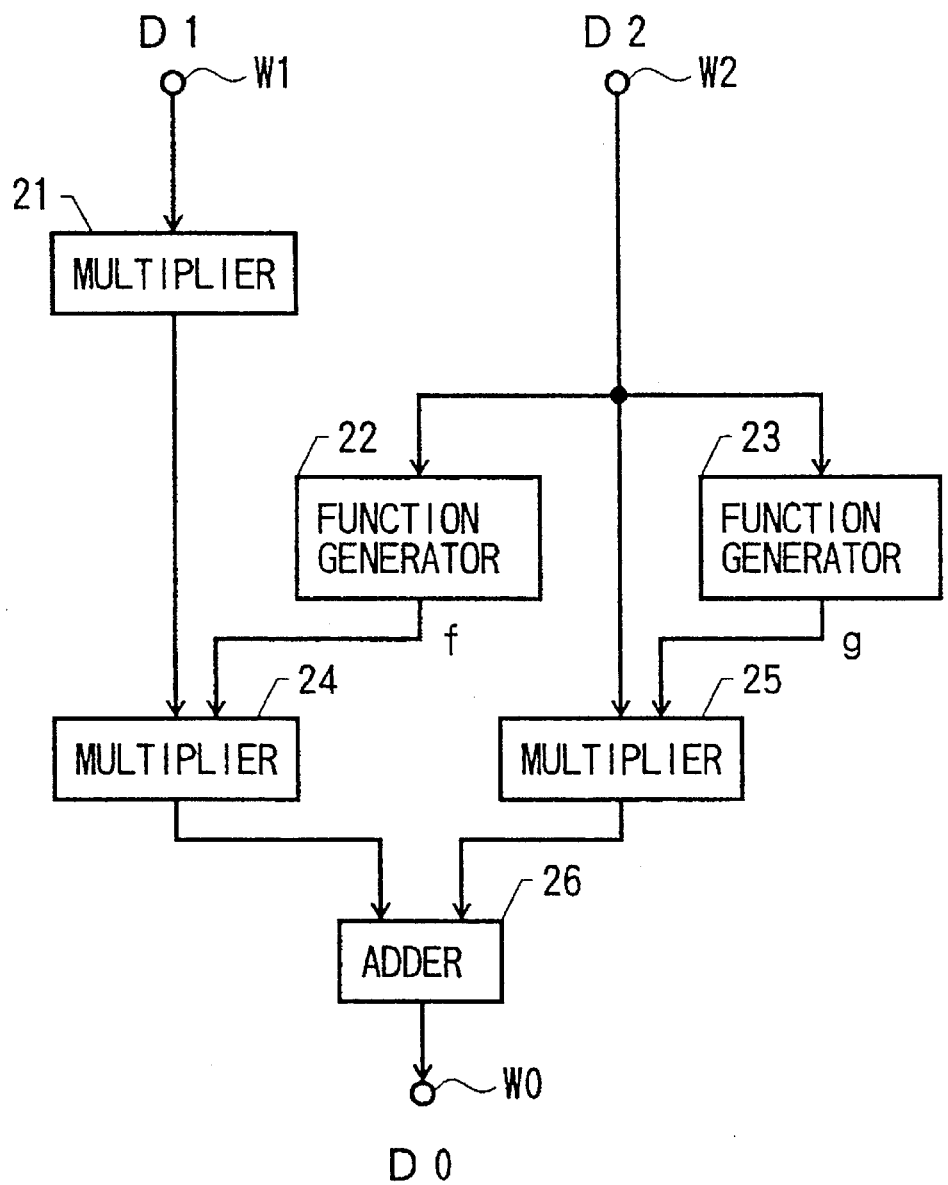
FIG. 6 is a block diagram showing the detail constitution of calculating device in the first embodiment of this invention.

FIG. 6 shows a construction of the calculating device 3. It is the device which calculates a composite value of two ones input through the first input terminal W1 and the second input terminal W2 and outputs the composite value into the second input terminals V2 and U2 of the selectors 5 and 6, respectively. The value input through the second input terminal W2 is converted into two function values by function generators 22 and 23, respectively. The value input through the first input terminal W1 is multiplied by a predetermined coefficient in a multiplier 21 and the calculation result is output to another multiplier 24. The value input into the multiplier 24 is further multiplied by the output of the function generator 22, and then the result is output to an adder 26. On the other hand, both values input through the second input terminal W2 and the function value converted by the Function generator 23 are output to a multiplier 25. After they are multiplied by the multiplier 25, the result is output to the adder 26. The adder 26 adds the output from the multiplier 24 to the output from the multiplier 25, and then the result is output as a composite gray value D0 from an output terminal W0.

A receiving plane of the image sensing element 1 is designed to project an image of a picturing object by an optical system. The output of the image sensing element 1 is to show linearity in an unsaturated region although some fluctuations can be seen under changes of temperature, and so on. In the first embodiment of this invention, an exposure on pictures is designed to change in two steps by a shutter speed. The faster the shutter speed becomes, the lesser the exposure on the receiving plane becomes. Alternatively, placing a variable transparent filter made of liquid crystal, which controls the amount of incident ray electronically, can be used for varying the exposure on the receiving plane.

The calculating device 3 is constituted to calculate and to output the composite gray value D0 with an expanded dynamic range from the output terminal W0 when the first and second gray values of two pictures with the different exposures T1 and T2 controlled by the shutter speed are input to the first input terminal W1 and the second input terminal W2, respectively. Here, T1 and T2 are exposure time of the first and second gray values D1 and D2, respectively.

The image memory 4 is a memory with bit-map format which retains a picture taken by a camera with the first shutter speed T1 or a picture with the expanded dynamic range output by the calculating device 3. The memory 4 is constituted to read out the gray value from an address prior to writing it into the address of corresponding each picture element. FIG. 4 shows an example of constitution of the image memory 4. Reference numeral 10 shows a memory, 11 an address converter, and 12 a register in FIG. 4.

The selector 5 is constituted to output an output either from the A/D converter 2 or the calculating device 3 to the image memory 4 selectively. The selector 6 is constituted to output an output either from the image memory 4 or the calculating device 3 to the D/A converter 7. The converter 7 outputs a video signal after it transforms output data from the selector 6 into an analog signal for each picture element.

The control device 8 controls the image sensing element 1, the A/D converter 2, the image memory 4, the selector 5, the selector 6, and the D/A converter 7 from which a picture with the expanded dynamic range is output. Further, the device 8 controls the image memory 4 to freeze the picture with the expanded dynamic range at a given timing.

The multiplier 21 in the calculating device 3 multiplies the first gray value D1 by an exposure ratio T2/T1 in order to convert the gray value D1 into a gray value corresponding to an sensitivity of the second gray value D2. The gray value D1 is input through the first input terminal W1 of the calculating device 3 and the gray value D2 through the second input terminal W2. Here, D1 and D2 denote first and second gray values of the first and second pictures with the exposures T1 and T2, respectively.

The function generators 22 and 23 in the calculating device 3 generate functions f and g, respectively. The function f of D2 is 0, lineally increases 0 to 1 and is 1 when D2 is not more than a predetermined level $D_{2a}$, is between $D_{2a}$ and a predetermined level $D_s$, and is not less than $D_s$, respectively. On the contrary, the function g of D2 is 1, lineally decreases 1 to 0 and is 0 when $D2 \leq D_{2a}$, $D_{2a} < D2 < D_s$ and $D_s \leq D2$, respectively.

Figure 7A:
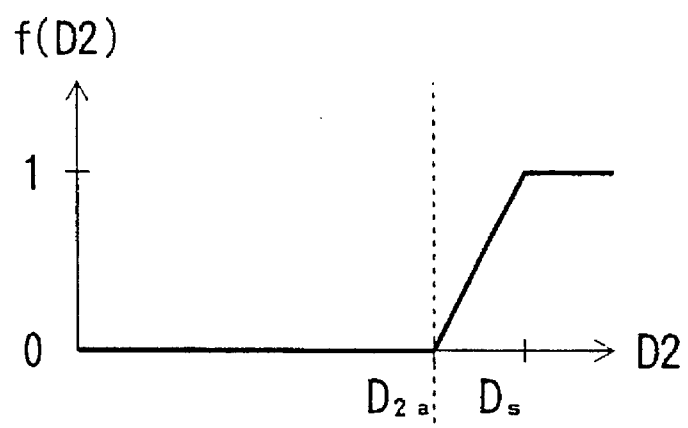
FIGS. 7(a) and 7(b) are characteristic figures of functions generated in the calculating device 3 in the first embodiment of this invention.
Figure 7B:
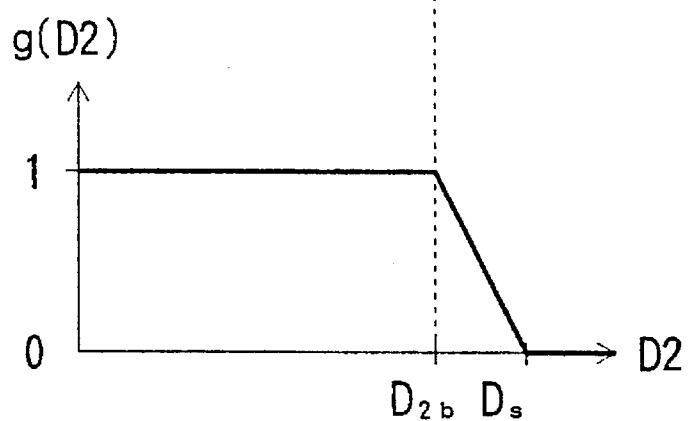

FIGS. 7(a) and 7(b) show examples of the functions f and g, respectively. As described later, those functions are to decide a composite ratio of the first and second gray values D1 and D2 for the composite picture with the expanded dynamic range. Therefore, it is desirable that f(D2)+g(D2) shows a constant unit value at any values of D2. As the example shown in FIGS. 7(a) and 7(b), g(D2) is defined as follows;

$$g(D2)=1-f(D2) \tag{6}$$

When f(D2)+g(D2) does not show a certain unit value at any values of D2 and fluctuates a little, it has no substantial influence on the function of this picturing device.

The multiplier 24 in the calculating device 3 outputs a related value of D1 to the adder 26 after an output value from the multiplier 21 is multiplied by an output from the function generator 22. The multiplier 25 outputs a related value of D2 to the adder 26 after the second gray value D2 is multiplied by an output from the function generator 23. The adder 26 sums up the outputs of the multipliers 24 and 25, and outputs a composite gray value D0 as an output of the calculating device 3.

As a result, the calculating device 3 shown in FIG. 6 outputs the composite gray value D0 for the picture with the expanded dynamic range, using the following equation with respect to the two input values D1 and D2;

$$D0=(D1 \times T2/T1) \times f(D2)+D2 \times g(D2) \tag{7}$$

Figure 21F:
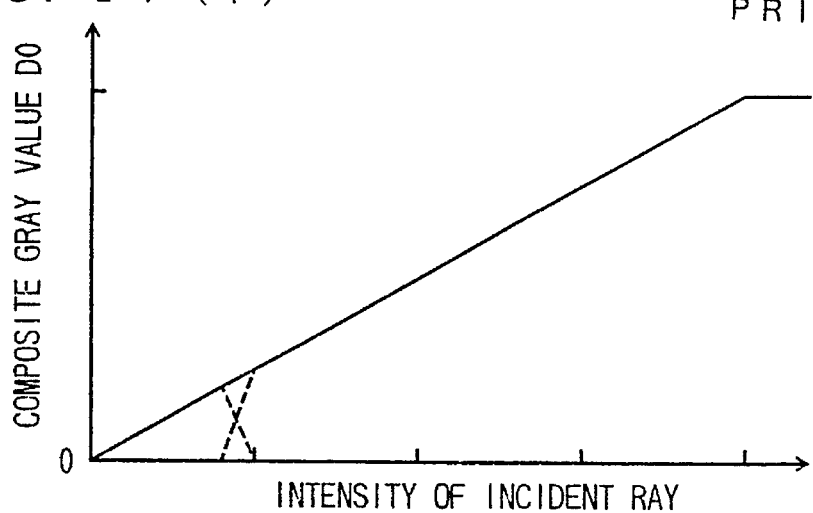
Figure 21G:
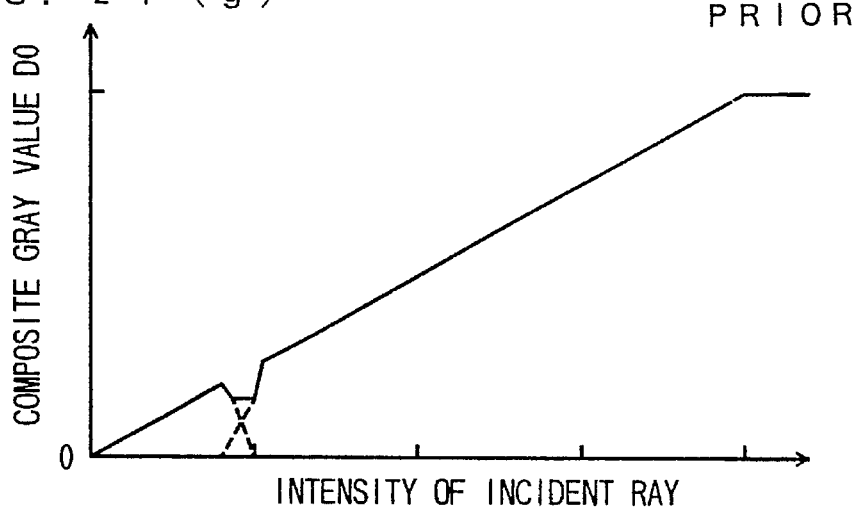
Figure 21H:
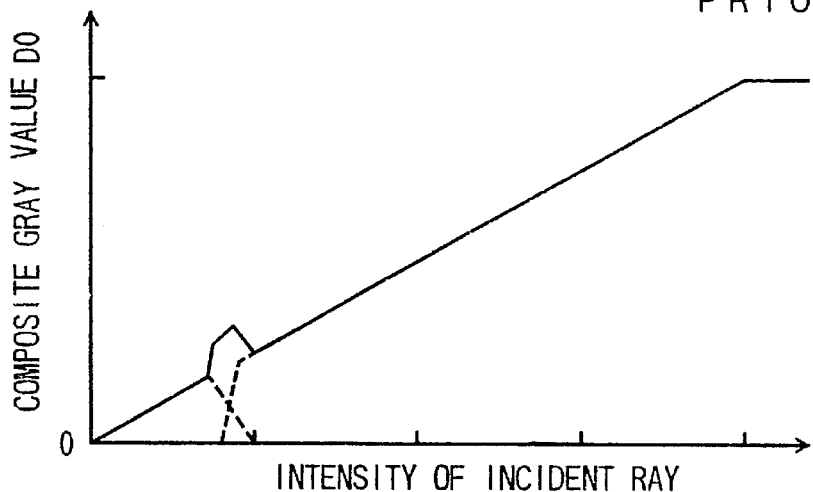

The device of the first embodiment of this invention is comprising the above described calculating device 3. It prevents the relation between the intensity of incident ray and a composite gray value D0 in the expanded dynamic range from becoming discontinuous as shown in FIGS. 21(g) and 21(h), the discontinuity being caused by a characteristic change of a camera and fluctuating illumination intensity over time on a picturing object. And also it prevents the composite picture from causing spikes at an edge of the gray value as shown in FIG. 23(b), the spikes being caused by a movement of a picturing object.

Namely, such problems are caused by obtaining the composite gray value D0 with the following equation, thereby gradually changing the weight coefficients of D1 and D2 around the transition parts;

$$D0=(D1 \times T2/T1) \times f(D1)+D2 \times g(D2) \tag{8}$$

Figure 23A:
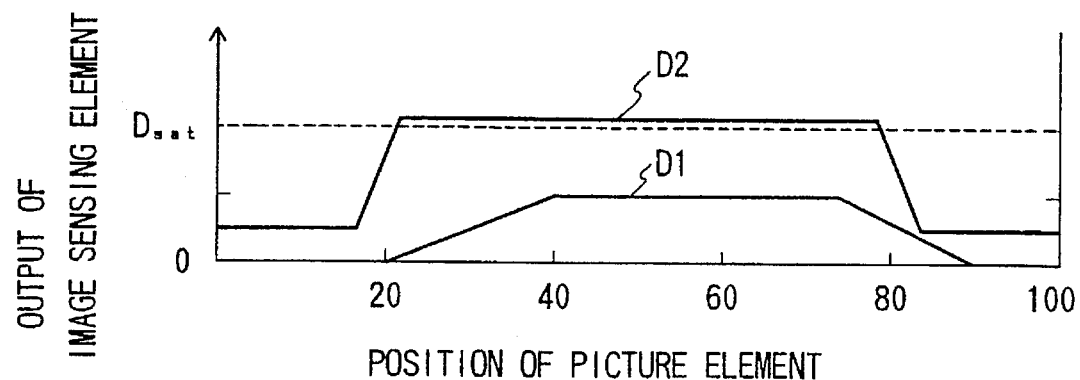
FIG. 23(a) is an explanatory figure of a position shift between a first picture with first gray value and a second picture with second gray value.
Figure 23B:
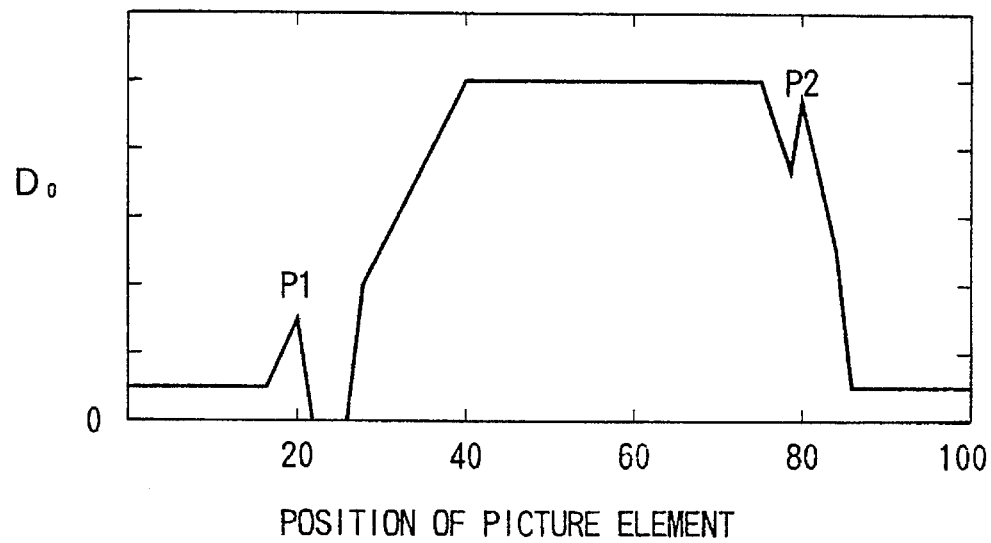
FIG. 23(b) is a characteristic figure of a composite gray value made of gray values shown in FIG. 23(a)

When the composite picture of a moving object is produced by Eq. 8, spikes P1 and P2 which do not inherently exist emerge in the composite picture as shown in FIG. 23(b), because of an image shift on picture elements between the pictures D1 and D2 as shown in FIG. 23(a). A process of emphasizing edges creates edges which do not inherently exist in the composite picture.

Figure 19A:
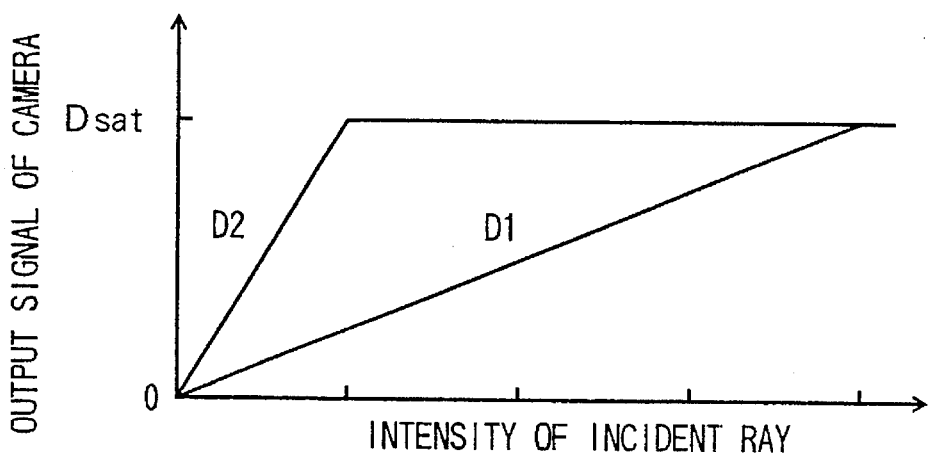
FIGS. 19(a) to 19(c) are characteristic figures showing the relation in direct proportion between the intensity of incident ray and the first gray value of the first picture taken with first exposure and the second gray value of the second picture taken with second exposure.
Figure 19B:
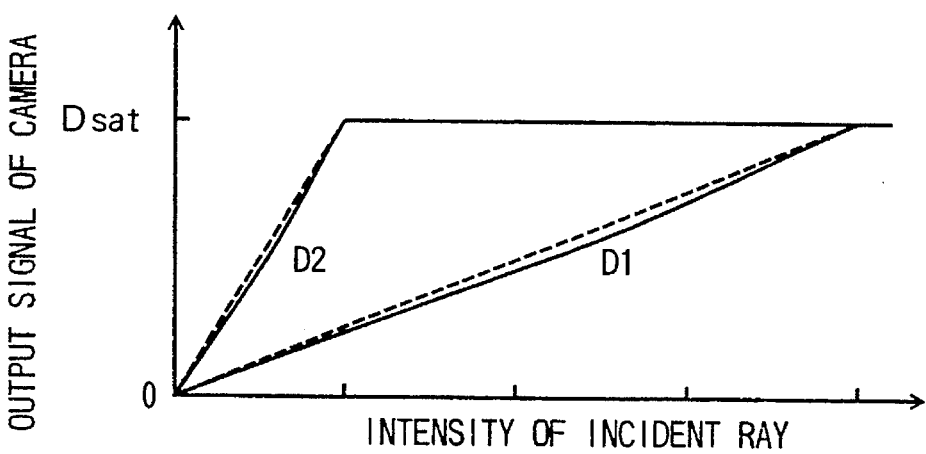
Figure 19C:
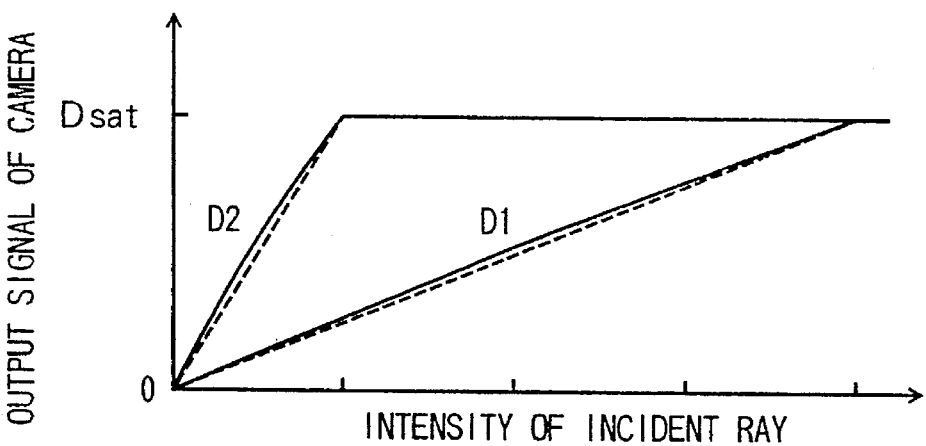
Figure 20A:
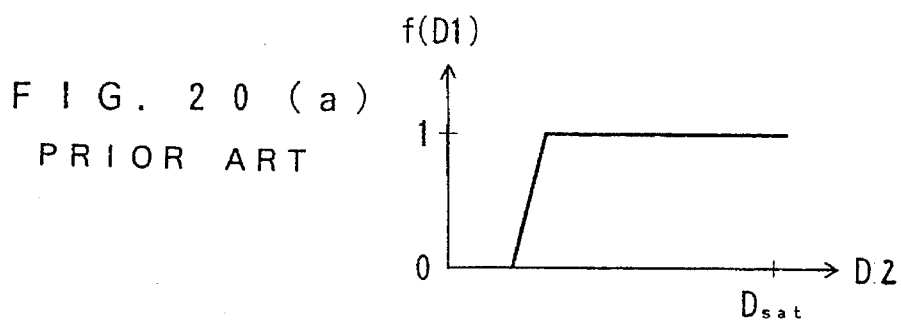
FIGS. 20(a) and 20(b) are characteristic figures of the two functions which determine weight coefficients for a composite picture.
Figure 20B:
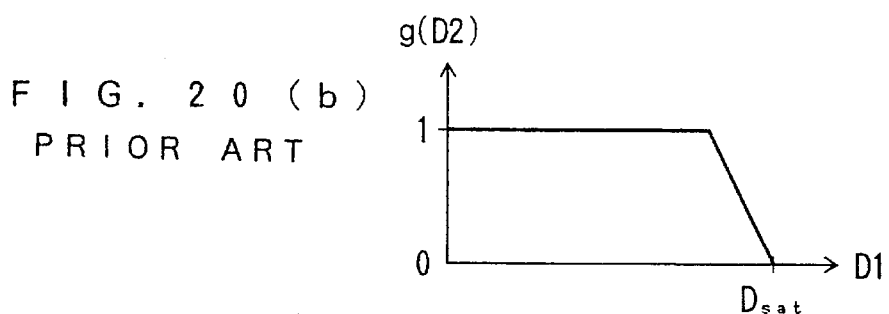
Figure 20C:
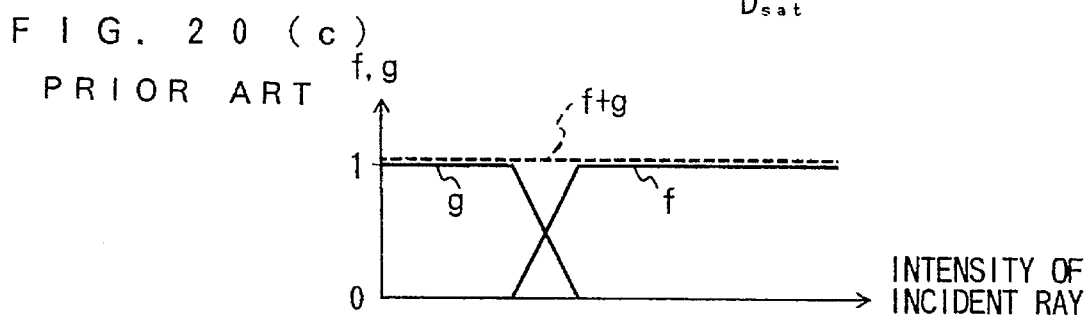
FIGS. 20(c) to 20(e) are characteristic figures of a composite value of the two functions in FIGS. 20(a) and 20(b)
Figure 20D:
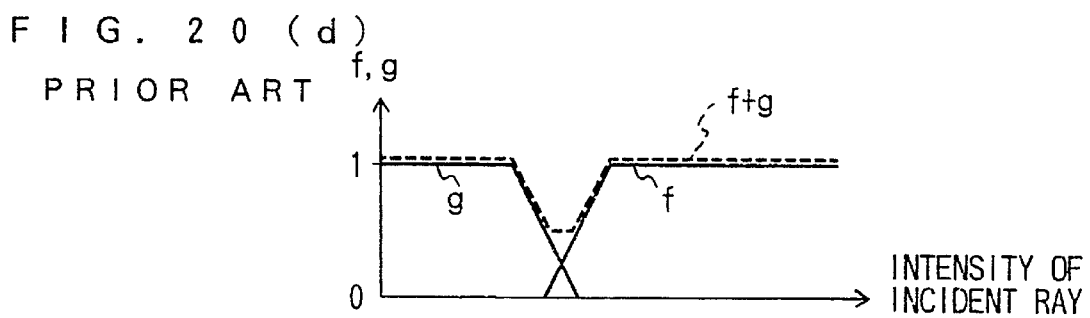
Figure 20E:
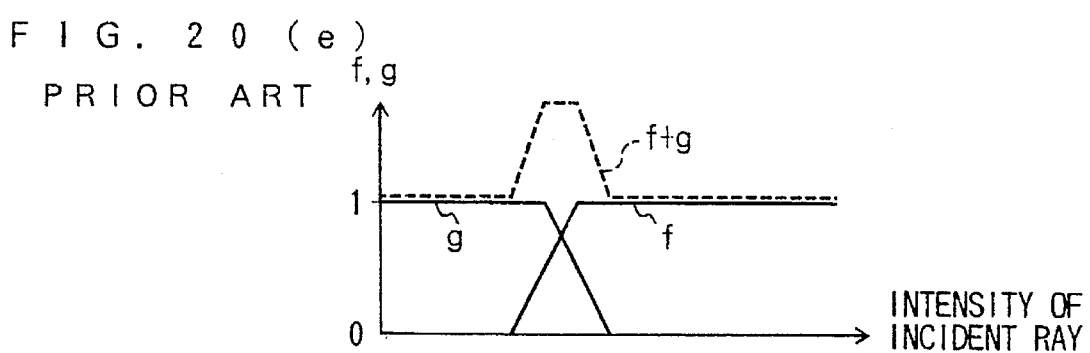

By nature, the sum of both weight coefficient f of the first gray value D1 and weight coefficient g of the second gray value D2 should show a constant unit value at any intensity of incident ray as shown by a broken line of FIG. 20(c). However, the characteristics of a camera is influenced by a temperature variation as shown by solid lines in FIGS. 19(b) and 19(c) actually. Accordingly, a sensitivity ratio of the second gray value D2 to the first gray value D1 differs from an exposure ratio in an unsaturated region of the same picture element. Such changed sensitivity affects the sum of both coefficients f and g depending on the intensity of incident ray largely and makes it different from a constant unit value as shown by broken lines in FIGS. 20(d) and 20(e) if using Eq. 8. As a result, the relation between the intensity of incident ray and the composite gray value D0 becomes improper in part as shown in FIGS. 21(f) and 21(g).

Further, when there is a position slide between the two pictures D1 and D2 as shown in FIG. 23(a), the ratio of the sensitivities of the first and second gray values D1 and D2 in the unsaturated region differ from the exposure ratio. Accordingly if using Eq. 8, the relation between the functions f and g becomes as shown in FIGS. 20(d) and 20(e), and f+g largely differs from a constant unit value as shown in broken lines. As a result, spikes which do not inherently exist emerge in the composite picture.

Such problems emerge, because two different weight coefficients are determined from the first gray value D1 and the second gray value D2 independently. In order to solve those problems, the first embodiment of this invention does not employ two independent coefficients for D1 and D2 independently but employs the two coefficients determined only from the second gray value D2 as a standard. It keeps the sum of weight coefficients f and g in constant in spite of the characteristic change of the camera, the position shift of the picture element, and so on.

Such arrangement using Eq. 7 enables the relation between the intensity of incident ray and the composite gray value D0 of the composite picture to become almost linear as shown in FIGS. 22(i) and 22(j), even when it is affected by the change in camera characteristics shown in FIGS. 19(b) and 19(c). Also, the characteristic figure of the composite picture shown in FIG. 24 has fewer spikes even when the picturing object is moving and the position of the picture element of the object changes from where the first picture is taken to where the second is as shown in FIG. 23(a). Thus, the first embodiment of this invention can reduce emergence of spikes P1 and P2 which do not inherently exist on the composite picture, which is shown in FIG. 23(b).

Figure 24:
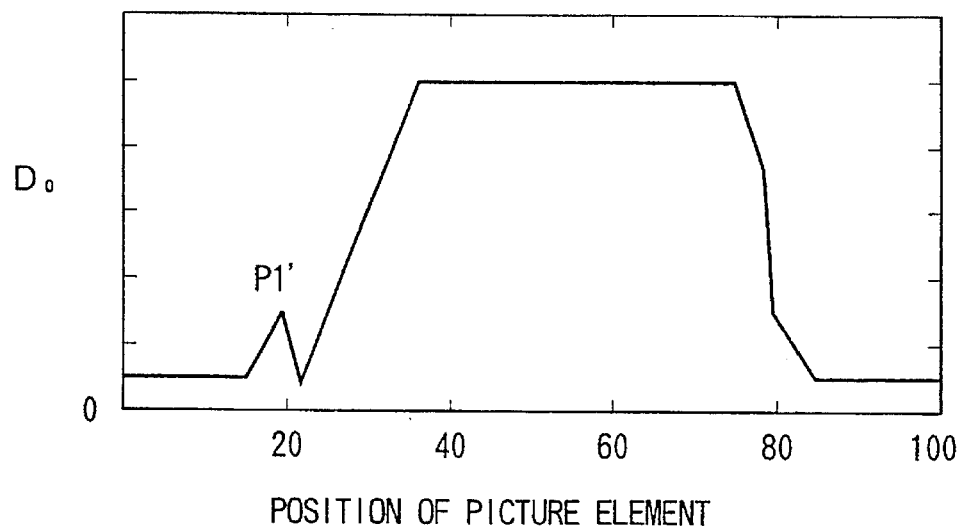
FIG. 24 is characteristic figure of the composite picture produced in the first embodiment of this invention.

The composite gray value D0 of picture elements shown in FIG. 24 is obtained when the weight coefficient functions f and g satisfy the formula $D_{2a}=D_{2b}=0.75 \times D_{sat}$ in FIGS. 7(a) and 7(b).

It is ordinary preferable to select a gray value of the picture with a larger exposure as a variable of the weight coefficients employed in Eq. 7, since the functions f and g are to decide the ratio of the first and second gray values D1 and D2 to be adopted around a saturation level of the picture with the larger exposure. In this embodiment, the exposures T1 and T2 show a relation T1<T2, and the second gray value D2 is selected as the common variable to decide the weight coefficients.

When the exposures T1 and T2 show a relation T1> T2, the first gray value D1 will be the common variable to decide the weight coefficients. Two different equations can be employed depending on the way converting gray value. When the first gray value D1 is converted into a gray value corresponding to the sensitivity of the second gray value D2, the composite gray value D0 is obtained with the following equation;

$$D0=(D1 \times T2/T1) \times f(D1)+D2 \times g(D1) \tag{9}$$

And also, when the second gray value D2 is converted into a gray value corresponding to the sensitivity of the first gray value D1, D0 is calculated by the following equation;

$$D0=D1 \times f(D1)+(D2 \times T1/T2) \times g(D1) \tag{10}$$

As shown in FIG. 24, a spike in the composite picture calculated by Eq. 7 becomes smaller than that shown in FIG. 23(b) calculated by Eq. 8. It is because a common variable. i.e. the second gray value D2, is adopted as a variable of the functions f and g, and continuity for the picture element is maintained around the transitional region from the first gray value D1 to the second gray value D2 as a result.

In case of a moving object, however, the spike P1' still emerges as shown in FIG. 24. It is because the position of the picture element of the image slides where the first picture is taken to where the second picture is taken, and the converted gray value of the first gray value D1 corresponding to the sensitivity of the second gray value D2 does not correspond to D2. As a result, such a difference makes the sum of the weight coefficient functions discontinuous around the transitional region from the first gray value D1 to the second gray value D2. Especially when the converted gray value of D1 corresponding to the sensitivity of the second gray value D2. D1×T2/T1, is smaller than the second gray value D2, the relation between the intensity of incident ray and the composite gray value D0 shows inverse proportion, which results in emergence of the spike P1' as shown in FIG. 24.

Example 2

In the second embodiment of this invention, the composite gray value D0 is defined as D2 when D2 satisfies the formula (D1×T2/T1)<D2. It prevents the relation between the intensity of incident ray and the composite gray value D0 from showing inverse proportion in the transitional region, and prevents the spikes which do not inherently exist from emerging.

Figure 8:
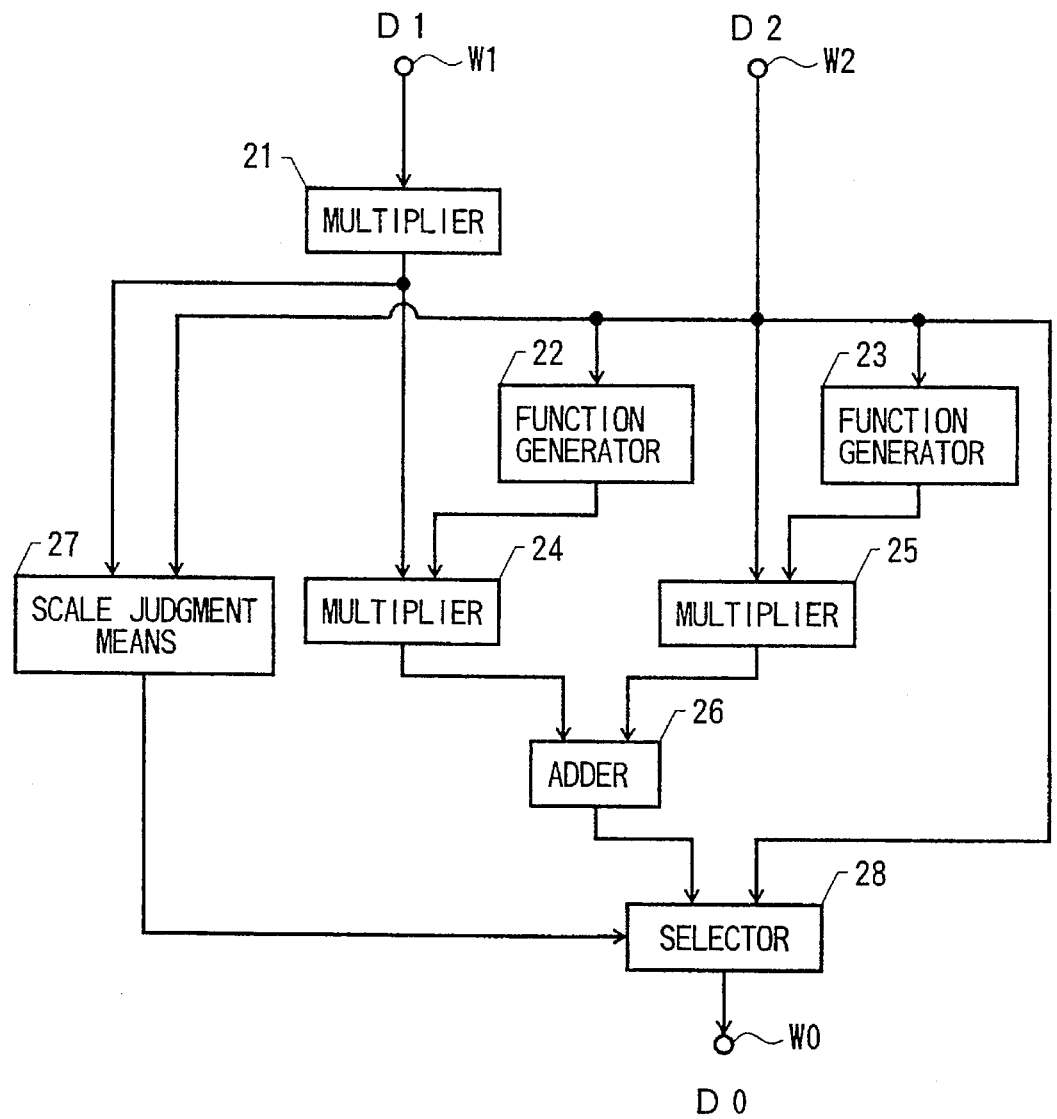
FIG. 8 is a block diagram showing the constitution of an image sensing device in the second embodiment of this invention.

FIG. 8 shows the constitution of the calculating device 3 of the second embodiment. FIG. 8 has a judgment means 27 and a selector 28 in addition to the constituents of FIG. 6. An output of the selector 28 will be the output of the calculating device 3.

The judgment means 27 judges which is bigger, the output of the multiplier 21 or the second gray value D2. The selector 28 outputs either bigger signal of an output of the adder 26 or the second gray value D2 based on the result of the judgment means 27. When it is judged by the judgment means 27 that the output of multiplier 21 is smaller than the second gray value D2, the selector 28 outputs the second gray value D2 as an output of the calculating device 3. Otherwise, the selector 28 outputs the output of the adder 26.

Suppose the two inputs to the calculating device 3 are the first and second gray values D1 and D2. The calculating device 3 shown in FIG. 8 outputs the following gray value D0;

when D1×T2/T1≧D2, $$D0=(D1\times T2/T1)\times f(D2)+D2\times g(D2) \tag{11}$$

and when D1×T2/T1<D2, $$D0=D2 \tag{12}$$

Figure 25:
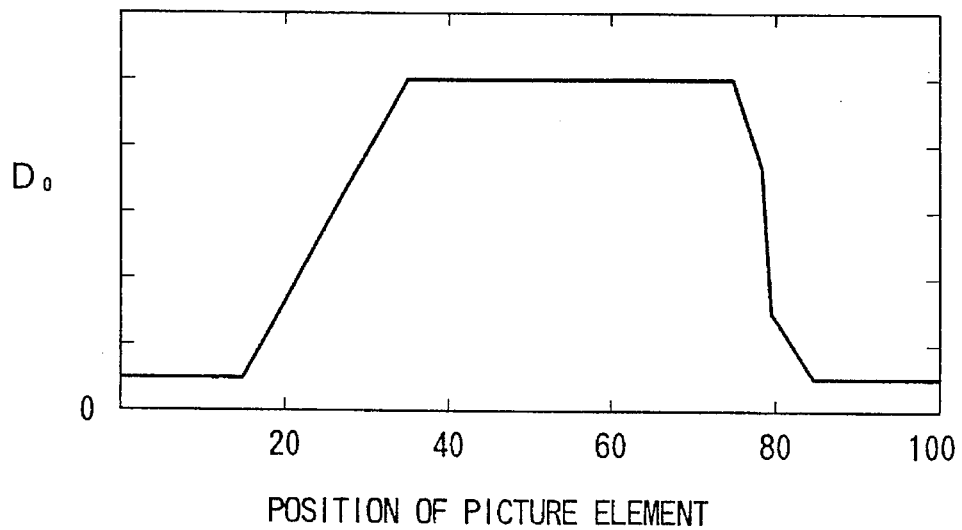
FIG. 25 is a characteristic figure of the composite picture produced in the second embodiment of this invention.

FIG. 25 shows the composite gray value D0 calculated by Eqs. 11 and 12. Even when the position of the picture element of the image slides from where the first picture is taken to where the second picture is taken as shown in FIG. 23(a), the spike P1' shown in FIG. 24 does not emerge any more. The composite gray value D0 in FIG. 25 is obtained when the weight coefficients f and g satisfy the formula $D_{2a}=D_{2b}=0.75\times D_s$ in FIGS. 7(a) and 7(b).

Figure 2:
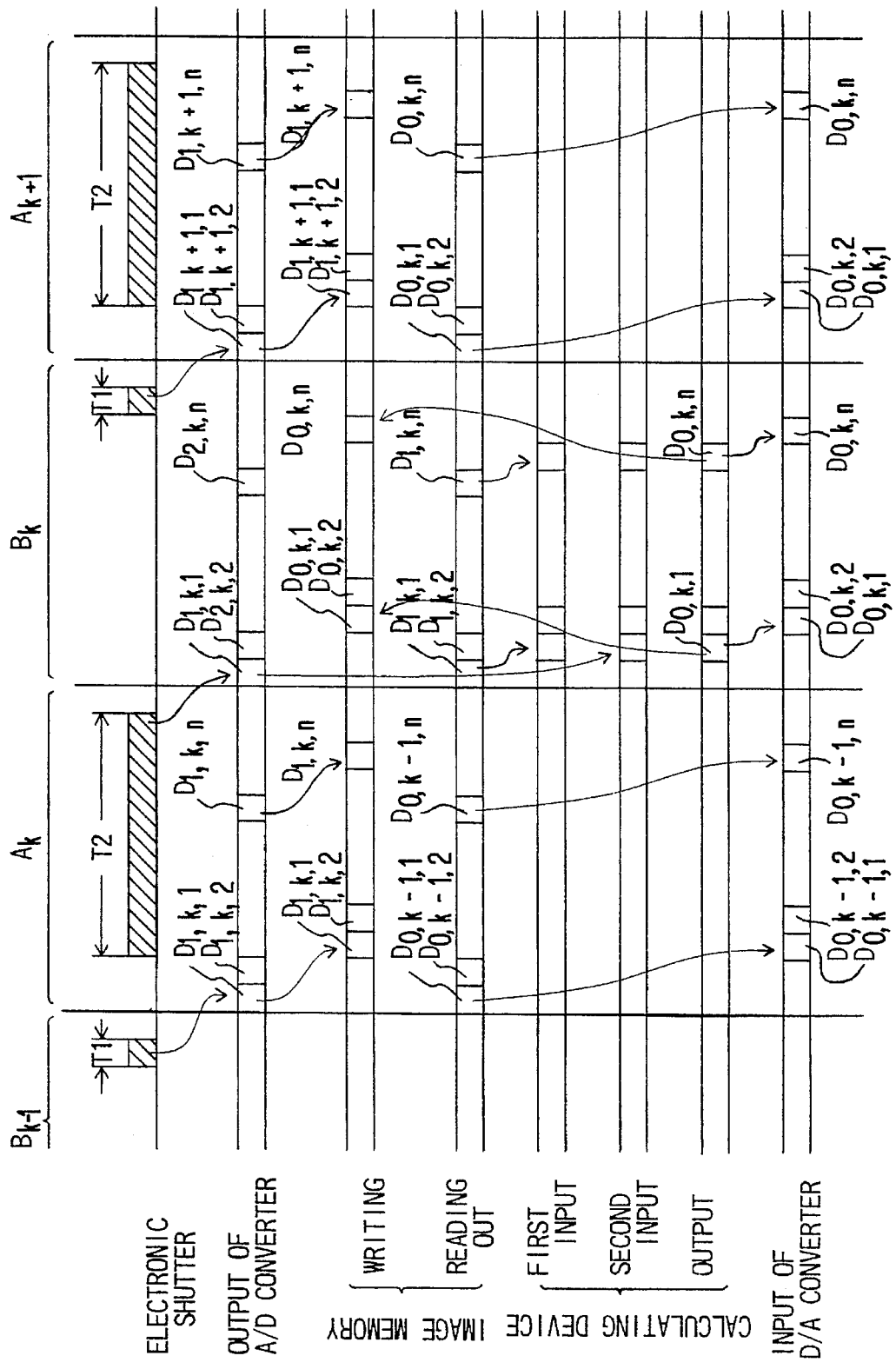
FIGS. 2, 3(a), and 3(b) are timing charts explaining operation of the image sensing device of FIG. 1.

Referring to FIG. 2, timing of data processing in the first and second embodiments of this invention is explained.

The device of the first and second embodiments has a control period, for obtaining the picture data with an expanded dynamic range, comprising a first time interval and a second time interval which succeeds to the first one. The image sensing element 1 charges carriers for the second exposure time T2 in the first time interval and does carriers for the first exposure time T1 in the second time interval. In the first time interval, the first gray value D1 of the first picture taken with the exposure time T1 in the second time interval of a preceding control period is read out. In the second time interval, the second gray value D2 of the second picture taken with the exposure time T2 in the first time interval of a current control period is read out.

The kth control period is comprising a first time interval $A_k$ and a second time interval $B_k$. An exposure period is preceding to a period for reading out data from the image sensing element 1 by one time interval. For example, the image sensing element 1 is exposed for the first exposure time T1 in a second time interval $B_{k-1}$ of the k–1th control period, and the data of the picture exposed for the exposure time T1 is repeatedly read out for each picture element in a first time interval $A_k$ of a next kth control period. Similarly, the image sensing element 1 is exposed for the second exposure time T2 in the first time interval $A_k$ of the kth control period, and the data of the picture exposed with the exposure time T2 is repeatedly read out for each picture element in a second time interval $B_k$ of the kth control period.

Operation of the image sensing device in the first and second time intervals is respectively described in the following paragraphs.

Operation in the First Time Interval $A_k$ of the kth Control Period

In the first time interval $A_k$ of the kth control period, the first input terminal V1 of the selector 5 is set in a mode to connect its output terminal. This connection enables the first gray value D1 output by the image sensing element 1 to be successively sent and stored by each picture element in the image memory 4. The first input terminal U1 of the selector 6 is set in a mode to connect its output terminal. This connection enables the composite gray value D0 calculated and stored in the k–1th control period to be output to the D/A convertor 7.

Namely, composite gray values for each picture element $D_{0, k-1, 1}, D_{0, k-1, 2} \cdots D_{0, k-1, n}$ calculated in the k–1th control period are successively read out from respective addresses in the image memory 4 by each picture element in the interval $A_k$. Then, those values are transferred to the D/A converter 7 through the selector 6, are transformed into an analog signal for each picture element, and are successively output as a video signal.

The first gray values $D_{1, k, 1}, D_{1, k, 2}, \ldots D_{1, k, n}$, which are read out from the image sensing element 1 and transformed into digital values by the A/D converter 2, are stored in respective addresses of the image memory 4 by each picture element through the selector 5 at a timing later than the time for reading out one picture element at least. As shown in FIG. 2, the composite gray value $D_{0, k-1, i}$ is read out from the address corresponding to a picture element i in the image memory 4 at the same timing as the first gray value $D_{1, k, i}$ of the picture element i which is output from the A/D convertor 2. The first gray value $D_{1, k, i}$ is written in the address corresponding to the picture element i in the image memory 4 after a certain time interval.

Figure 5:
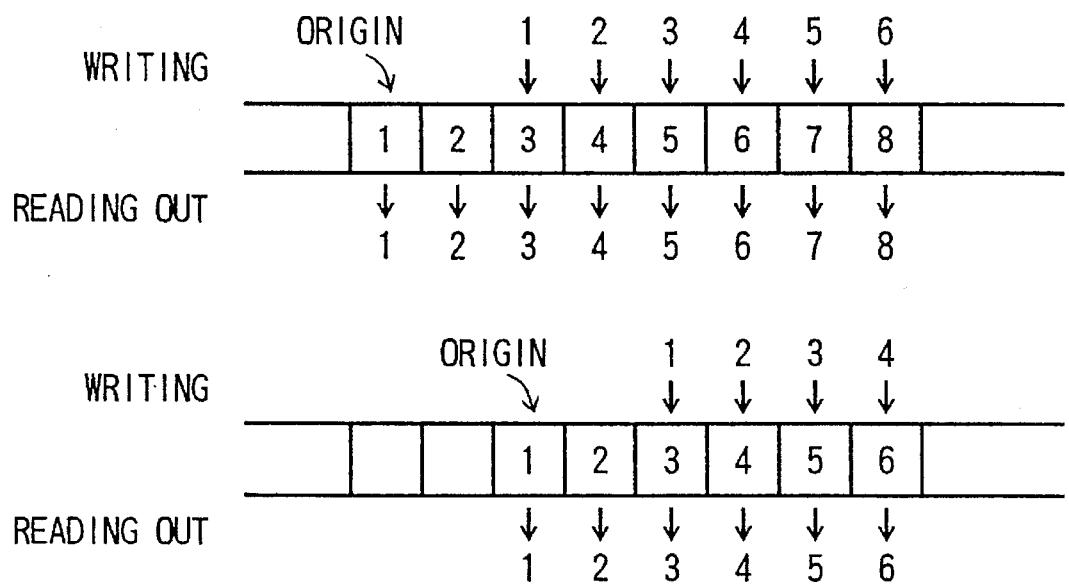
FIG. 5 is an explicative figure of reading out and writing in the image memory of FIG. 1.

FIG. 5 shows the operation of the image memory 4. An address corresponding to a picture origin of the memory 10 is set in the register 12. A picture address output by the control device 8 is transformed into an real address in the memory 10 by an address convertor 11 referring to the address corresponding to the picture origin stored in the register 12. As an example, a content of an address corresponding to a picture element 6 in the memory address 10 is output. At the same time, the image memory 4 receives a value of a picture element 4 and stores it in the same address as the data of the picture element 6 has been stored in. This process is repeatedly carried in this time interval $A_k$, and then the address stored in the register 12 is renewed into a new address with a new origin.

While the first gray value D1 of the first picture is read out from the image sensing element 1 in the first time interval $A_k$, the second picture with the exposure time T2 is being taken by the image sensing element 1.

Operation of the Second Time Interval $B_k$ of the kth Control Period

In the second time interval $B_k$ of the kth control period, the second input terminal V2 of the selector 5 is set in a mode to connect its output terminal. This connection enables the composite gray value D0 calculated by the calculating device 3 to be successively sent and stored for each picture element in the image memory 4. The second input terminal U2 of the selector 6 is set in a mode to connect its output terminal. This connection enables the composite gray value D0 calculated by the calculating device 3 to be output to the D/A convertor 7.

Further, in the second time interval $B_k$, the second gray values $D_{2, k, 1}, D_{2, k, 2}, \ldots D_{2, k, n}$ which are read out from the image sensing element 1 and transformed into digital values by the A/D converter 2 are repeatedly input through the second input terminal W2 of the calculating device 3 for each picture element. On the other hand, the first gray values $D_{1, k, 1}, D_{1, k, 2}, \ldots D_{1, k, n}$ stored in the image memory 4 during the first time interval $A_k$ are simultaneously read out with the input of the second gray value for each picture element. Those read out values are successively input to the calculating device 3 by way of the first input terminal W1.

In the calculating device 3, the composite gray values are respectively calculated based on the first gray values $D_{1, k, 1}, D_{1, k, 2}, \ldots D_{1, k, n}$ input through the first input terminal W1 and the second gray values $D_{2, k, 1}, D_{2, k, 2}, \ldots D_{2, k, n}$ input through the second input terminal W2, and then are input into the second input terminal W2 of the selector 6 through the output terminal NO of the calculating device 3. The composite gray values are output into the D/A converter 7 through the selector 6, are transformed into the analog signal for each picture element, and are successively output as the video signal.

Simultaneously, the composite gray values $D_{0, k, 1}, D_{0, k, 2}, \ldots D_{0, k, n}$ are input to the selector 5 through the second input terminal V2 and then stored in the respective addresses in the image memory 4 corresponding to each picture element through the selector 5. Such storing in the image memory 4 is designed to be carried out after the content of the each address is read out as described above.

Further, in the second time interval $B_k$, an image is obtained with the first exposure time T1 by the image sensing element 1. The obtained picture is read out during the first time interval $A_{k+1}$ of the next control period k+1 by the image sensing element 1.

Thereafter the same operation as described above is repeatedly carried out in the first and second time intervals, respectively.

When it is required to freeze a picture for a purpose of image processing and when a timing signal 9 for freezing is sent to the control device 8 at any points, picturing is suspended at an end of the second time interval $B_k$. That enables the picture of a complete composite gray value with an expanded dynamic range to be frozen constantly in the image memory 4.

Figure 3:
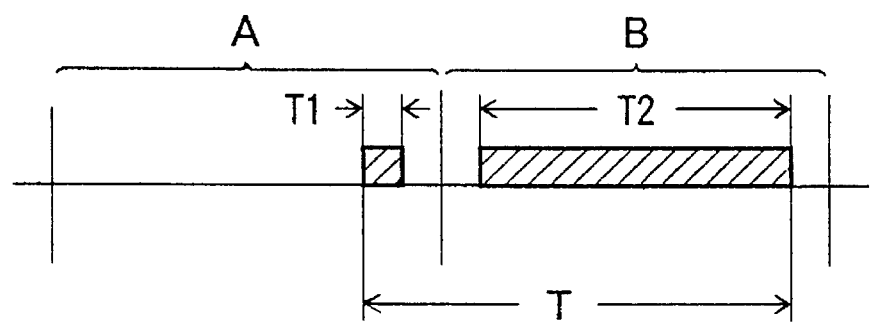
Figure 3:
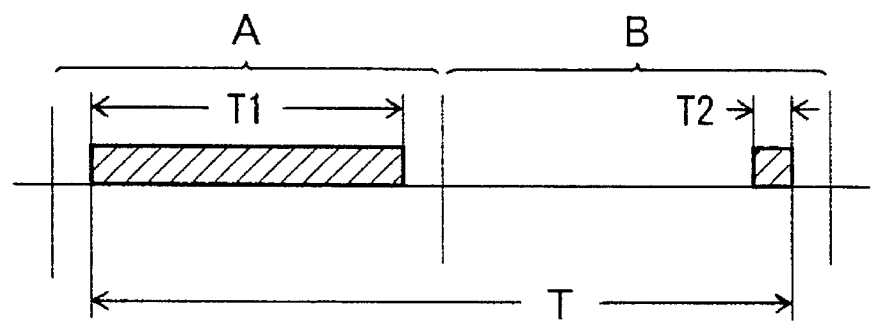

It is unable to escape from deflections on the composite picture, because of a long interval between two charging periods with the exposures T1 and T2. On the contrary, the present invention solves such a problem by controlling the timing of taking pictures with the exposures T1 and T2. Conventionally, an electronic shutter installed in a CCD imager is designed to control the exposure by sweeping out signal charges for a certain period from the beginning of the field begins and, then, integrating signal charges for a certain period. As shown in the first and second embodiments of this invention, the exposure time T1 and T2 satisfy the relation T1<T2. It enable the interval T between the charging time of the first picture with the exposure time T1 and that of the second with the exposure time T2 to be shortened as shown in FIG. 3(a). Such arrangement results in minimizing deflections on the composite picture with the expanded dynamic range. Suppose the exposure time T1 and T2 is satisfied with T1>T2 as shown in FIG. 3(b), the interval T between the two carrier charging periods T1 and T2 become longer and the composite picture results in having larger deflections thereon.

Example 3

Figure 9:
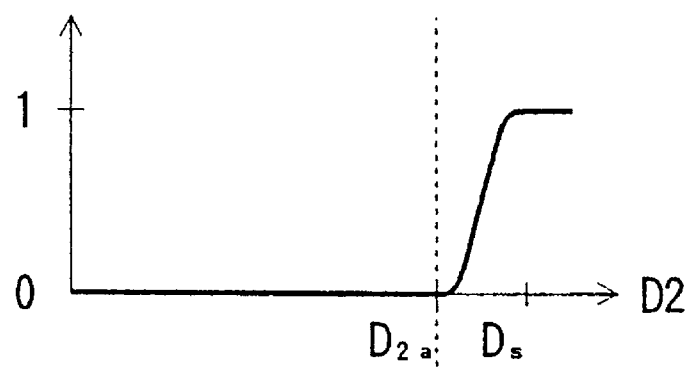
FIGS. 9(a) and 9(b) are characteristic figures of functions generated in the calculating device 3 in the third embodiment of this invention.
Figure 9:
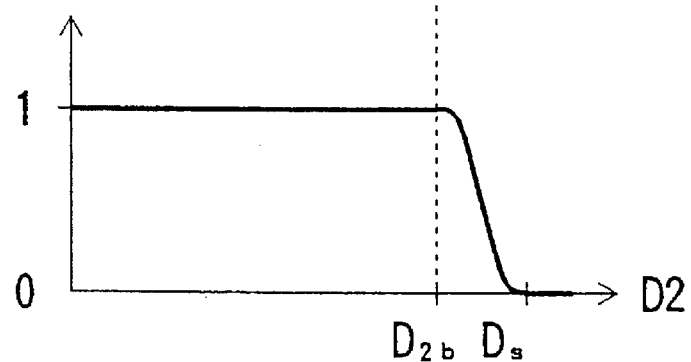

In the third embodiment of this invention, the device of the first one shown in FIG. 1 is utilized. In stead of the two functions f and g shown in FIGS. 7(a) and 7(b), those in FIGS. 9(a) and 9(b) are employed in this embodiment. There is no need to limit the functions only shown in FIGS. 7(a), 7(b), 9(a) and 9(b). Any functions are acceptable as the function f if it gradually increases its value 0 to 1 as an independent variable increases a first predetermined value to a second. Similarly, any functions are acceptable as the function g if it gradually decreases 1 to 0 as the independent variable increases the first to second. Further, there is no influence to the result of this embodiment if 2 is employed in stead of 1 as the function value. The results are just doubled. It is because function values 1 and 2 show a mere constant unit amount of the weight coefficients to a converted gray value corresponding to the sensitivity of the second gray value D2.

Example 4

Figure 10:
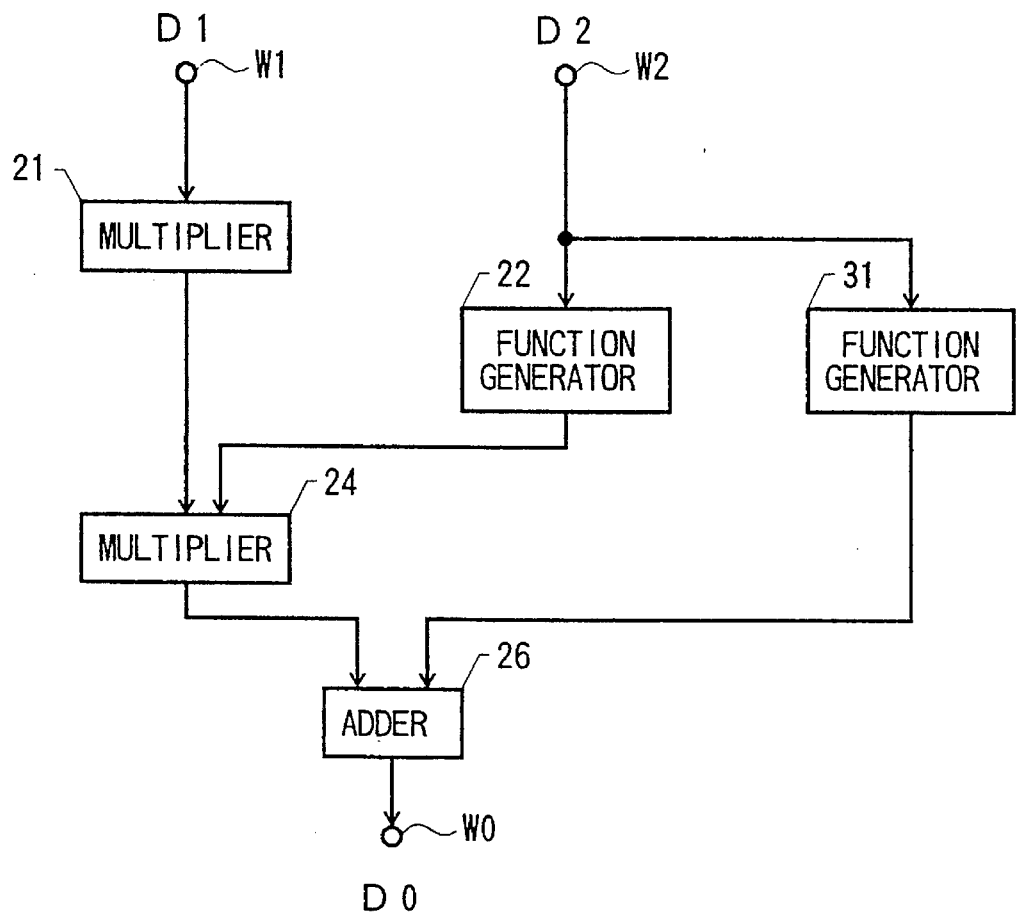
FIG. 10 is block diagram showing the constitution of a calculating device in the fourth embodiment of this invention.

As shown in FIG. 10, the fourth embodiment of this invention can reduce a size of hardware in which the calculating device 3 shown in FIG. 6 is utilized. In the first embodiment, two function generators, three multipliers, and one adder are necessary to be installed in addition when the calculating device is utilized in a hardware. As a result, the hardware has to be big. The fourth embodiment solves this problem.

Referring to FIG. 10, the calculating device in the forth embodiment is comprising a function generator 31 which directly generates a weighted second gray value. Function of the function generator 31 can replace function of the function generator 23 and the multiplier 25 shown in FIG. 6. Namely, the function generator 31 outputs a value D2×g(D2) by itself when a second gray value D2 is input. Other constituents of FIG. 10 is as same as those of FIG. 6.

Since the calculating device shown in FIG. 10 is consisting of only two function generators, two multipliers, and an adder, the hardware construction of this calculating device is simpler than the calculating device shown in FIG. 6. The

15 each function generator shown in FIG. 10 is utilized in a lookup table as an example.

Example 5

Figure 11:
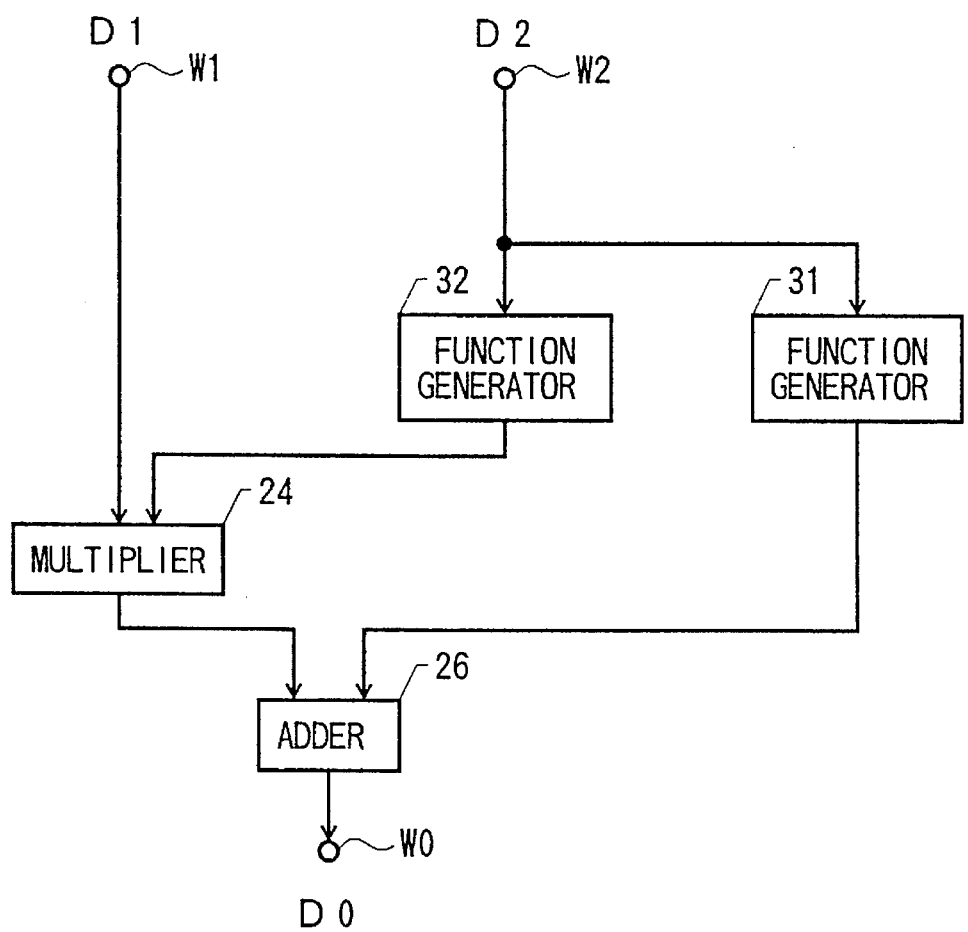
FIG. 11 is a block diagram showing the constitution of a calculating device in the fifth embodiment of this invention.

FIG. 11 shows a variation of the calculating device shown in FIG. 10. A function generator 32 in FIG. 11 outputs a value that is equal to the output of the function generator 22 shown in FIG. 10 multiplied by the output of the multiplier 21 in FIG. 10. Namely, the function generator 32 outputs a value T2/T1×f(D2) by itself when the second gray value D2 is input.

Since the calculating device shown in FIG. 11 is consisting of only two function generators, a multiplier, and an adder, the hardware construction becomes simpler than the calculating device shown in FIG. 10.

Example 6

Figure 12:
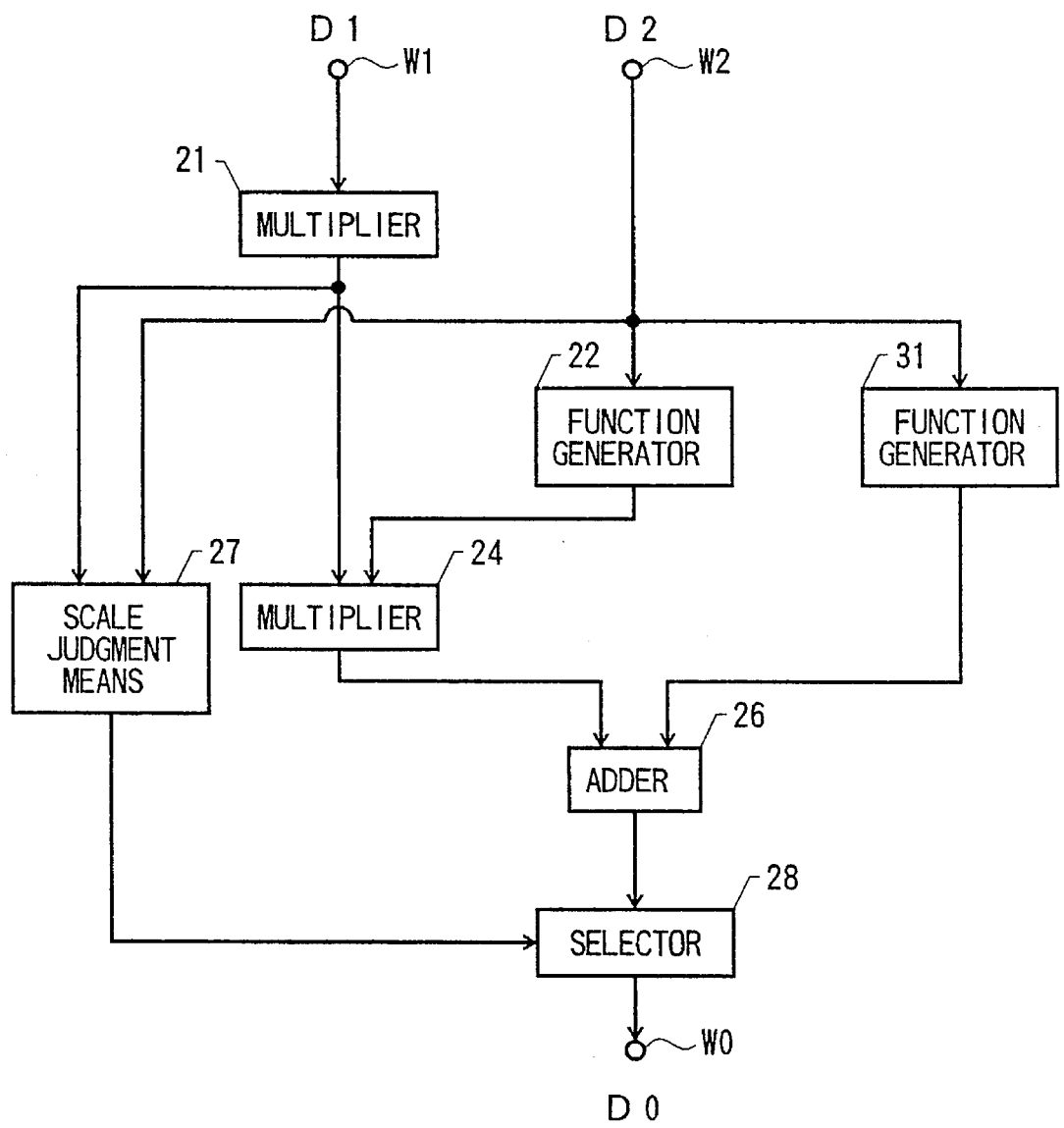
FIG. 12 is a block diagram showing the constitution of a calculating device in the sixth embodiment of this invention.

FIG. 12 shows a constitution of calculating device which is a combination of those shown in FIGS. 8 and 10. Compared with the calculating device shown in FIG. 8, that in FIG. 12 can be a simpler hardware.

Example 7

Figure 13:
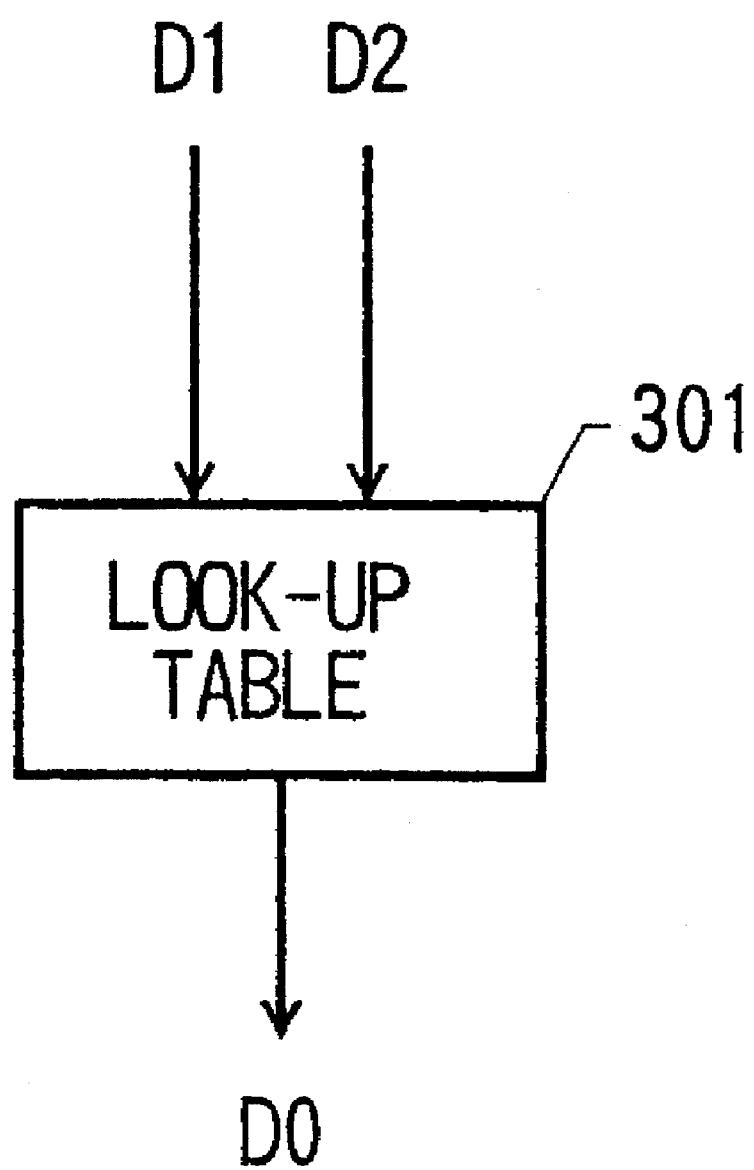
FIG. 13 is a block diagram showing the constitution of a calculating device in the seventh embodiment of this invention.

FIG. 13 shows a look up table 301 as an alternative of the calculating device 3 in FIG. 1. It is possible to replace the calculating device 3 by the look-up table 301. Namely, the table is calculated and prepared in advance which lists all possible gray values D0 calculated to any combination of first and second gray values D1 and D2, which will be input in the calculating device 3. Replacing by the calculating device 3 the table makes a constitution of the control device simpler than ever.

When an output value d of the image sensing element 1 does not show linearity to the intensity of incident ray, it is possible to convert the output into that which shows linearity by incorporating a function h(d) in the table. As an example, a table is prepared by calculating the following equation, corresponding to Eq. 7:

$$D0 = (h(d1) \times T2/T1) \times f(h(d2)) + h(d2) \times g(h(d2)) \quad (13)$$

The values d1 and d2 show first and second gray values output by the image sensing element 1, respectively.

Example 8

As an example of the seventh embodiment, $2^{(8+8)}$, or 65,536, patterns of combination of the first gray value and the second gray value input in the calculating device 3 is possible when those gray values are input in eight bit binary, respectively. It means 65,536 address in a table are required.

Figure 14:
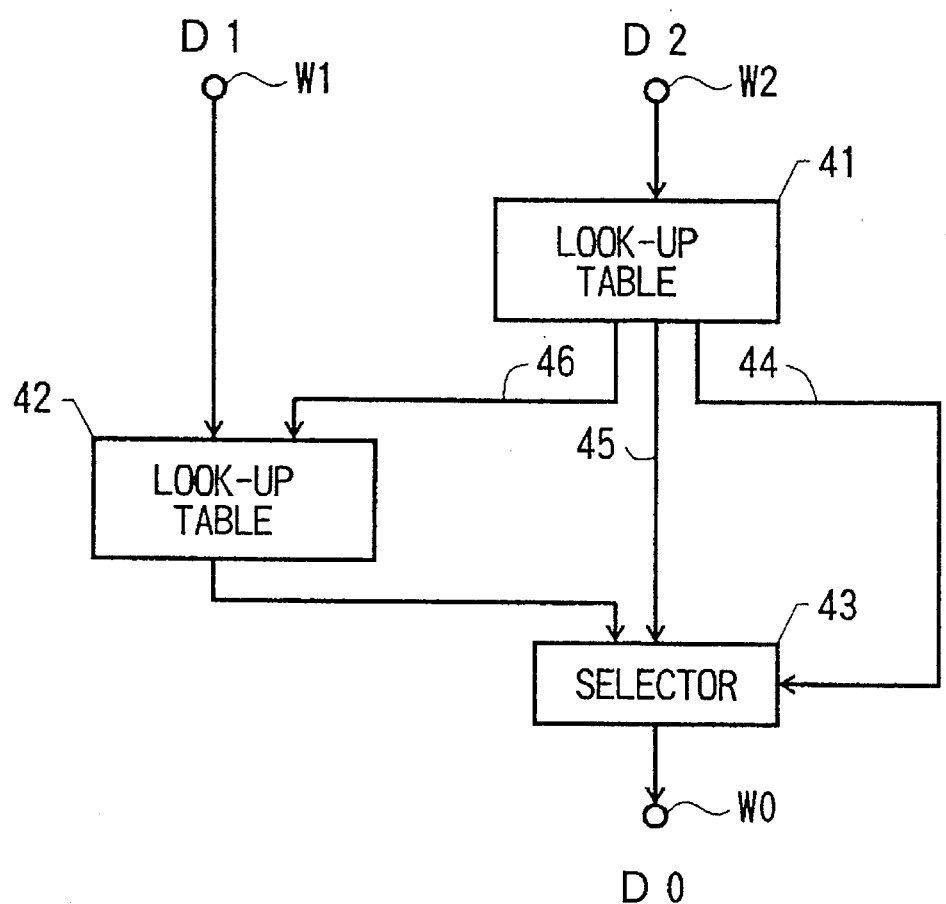
FIG. 14 is a block diagram showing the constitution of a calculating device in the eighth embodiment of this invention.

In the eighth embodiment of this invention, it is aimed to minimize the look up table by installing constituents shown in FIG. 14. The calculating device 3 in FIG. 1 is replaced by a device shown in FIG. 14. The device shown in FIG. 14 comprises two look-up tables 41 and 42, and a selector 43.

The functions f(D2) and g(D2) show 0 and 1 in most of D2 region as shown in FIG. 7, respectively. Accordingly, in the region of D2 satisfying f=0 and g=1, the look-up table 41 outputs D2 as a signal 45 and selects it in the selector 43 by a selection signal 44 output by the look-up table 41. With respect to the other region of D2, the look-up table 42 outputs data stored and calculated by the following equation:

When D1×T2/T1≧D2,

16

$$(D1 \times T2/T1) \times f(D2) + D2 \times g(D2) \quad (14)$$

When D1×T2/T1<D2, $$D2 \quad (15)$$

And the output of the lookup table 42 by a selection signal 44 is selected in the selector 43.

With such constitution, the device in the eighth embodiment can reduce the size of a look up table. Suppose that the gray values D1 and D2 input in the calculating device are represented by 8 bit binary, respectively, and that the functions f(D2) and g(D2) show 0 and 1 in D2 region of 0 to 191, respectively, the total input to the look-up table 42 consists of 8 bits of D1 and 6 bits of a signal 46. The signal 46 is output by table 41 which is defined in the D2 region of 192 to 255. In concrete number, the look-up table 42 only requires $2^{(8+6)}$, or 16384 addresses in a table and the look-up table 41 does $2^8$, or 256 addresses in a table As a result, the size of table of this embodiment is about one fourth as large as that of the seventh embodiment.

Example 9

Figure 15:
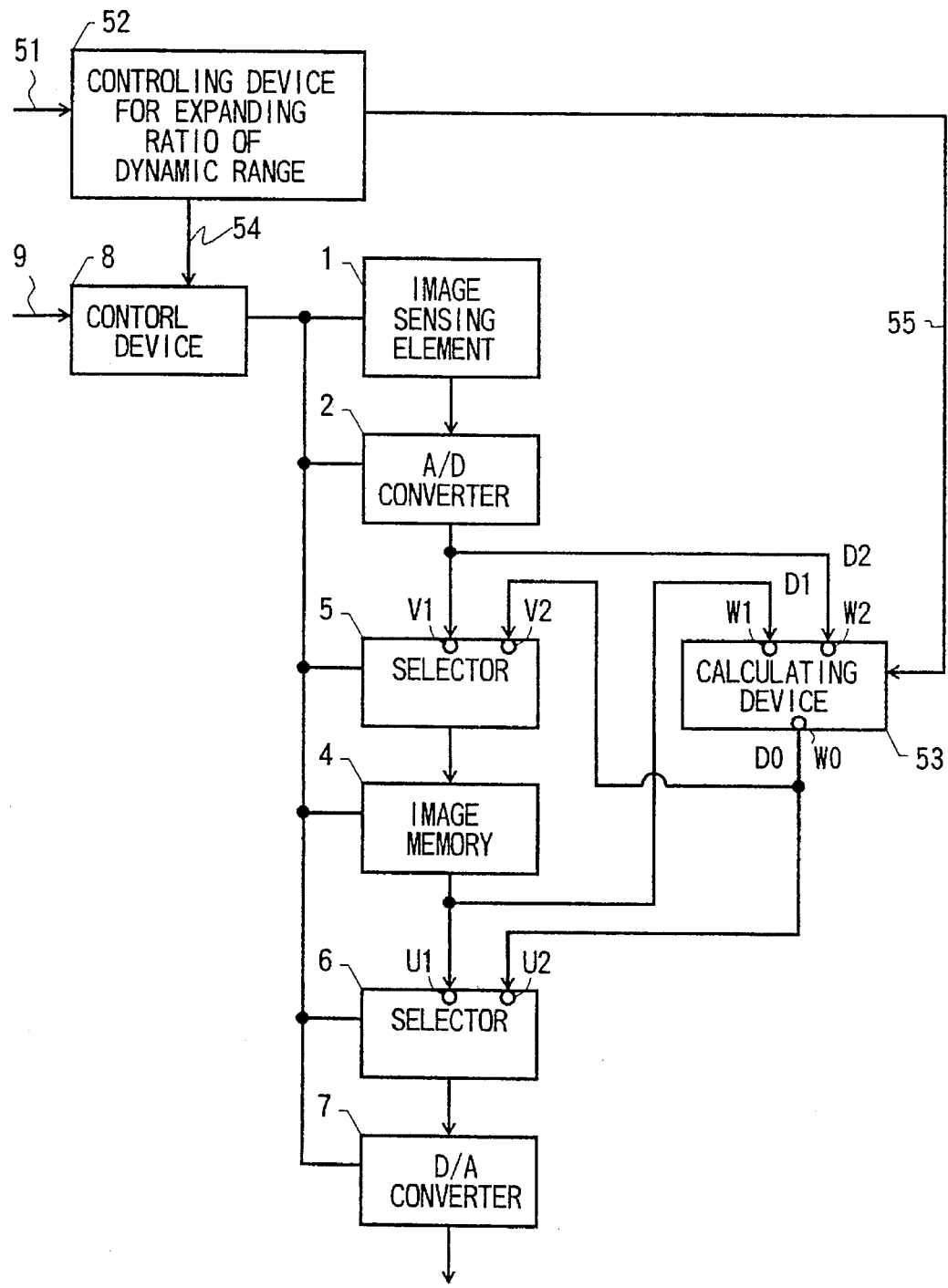
FIG. 15 is a block diagram showing the constitution of an image sensing device in the ninth embodiment of this invention.
Figure 16:
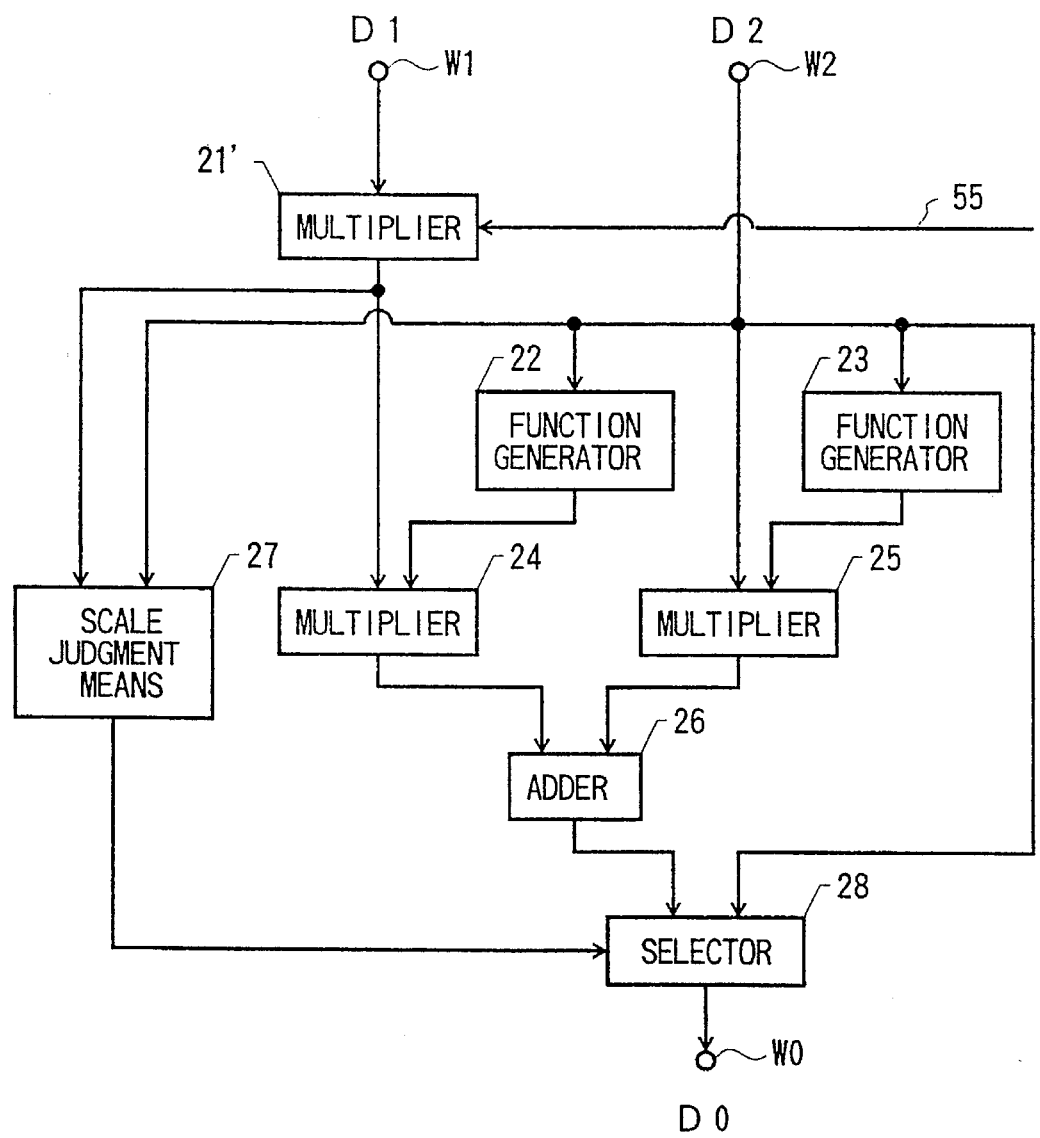
FIG. 16 is a block diagram showing a variation of a calculating device in the ninth embodiment of this invention.

FIG. 15 shows an image sensing device employed in the ninth embodiment of this invention. It is designed to alter the ratio of expanding dynamic range by a signal to do so. The device in FIG. 15 comprises a control device 52 for expanding ratio, a calculating device 53, and other constituents as same as those shown in FIG. 1. A signal 51 shows a instruction signal of expanding ratio. Signals 54 and 55 show control signals of magnification of the ratio. As shown in FIG. 16, the calculating device 53 comprises a multiplier 21' and other constituents as same as those shown in FIG. 7. When an expanding ratio of the dynamic range is assigned to the control device 52, the signal 54 output thereby is transmitted to the control device 8 and it changes the ratio of the first shutter speed T1 and the second shutter speed T2 for a certain value. At the same time, the signal 55 transmits the expanding ratio of the dynamic range to the calculating device 53 and the value T2/T1 multiplied by D1 in the multiplier 21' is changed, too. Alternatively, a look up table and so on can be used instead of the calculating device 53.

Example 10

Figure 17:
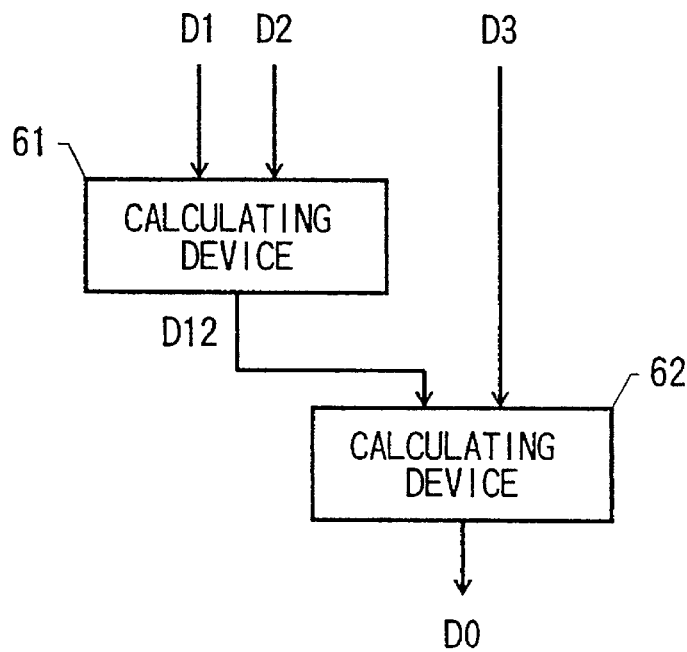
FIG. 17 is a block diagram showing the constitution of a calculating device in the tenth embodiment of this invention.

FIG. 17 shows an image sensing device employed in the tenth embodiment of this invention. It is designed to alter exposures into three steps, T1, T2, and T3 as they increase. In FIG. 17, reference numerals 61 and 62 are calculating devices and D1, D2, and D3 represent gray values of a picture element of the respective pictures taken with the respective exposures. The calculating devices 61 and 62 substantially function in the same way as that shown in the first embodiment. Suppose a picture was taken with three steps of exposures, such as T1, T2 and T3. When the second gray value D2 of the second picture with the exposure time T2 satisfies the formula (D1×T2/T1)≧D2, the calculating device 61 outputs an intermediate gray value D12 by the expression:

$$(D1 \times T2/T1) f(D2) + D2 \times g(D2) \quad (16)$$

When the D2 satisfies the formula (D1×T2/T1)<D2, the calculating device 61 outputs the intermediate gray value D12 calculated by the equation:

$$D2 \quad (17)$$

When the third gray value D3 of the third picture with the exposure time T3 satisfies the formula (D12× T3/T2)≧D3, the calculating device 62 outputs a final composite gray value D0 calculated by the expression;

$$(D12 \times T3/T2) \times f(D3) + D3 \times g(D3) \qquad (18)$$

When the D3 satisfies the formula (D12×T3/T2)<D3, the calculating device 62 outputs the final composite gray value D0 by the equation:

$$D3 \qquad (19)$$

Similarly, variations of this embodiment are applicable to any exposure steps for picturing an object.

The device of this embodiment shown in FIG. 17 is constituted to output the final composite gray value D0 by firstly calculating the intermediate gray value D12 from the first gray value D1 and the second gray value D2 in the calculating device 61, and then calculating the final composite gray value D0 from the output of the calculating device 61, or D12, and the third gray value D3 in the calculating device 62.

Figure 18:
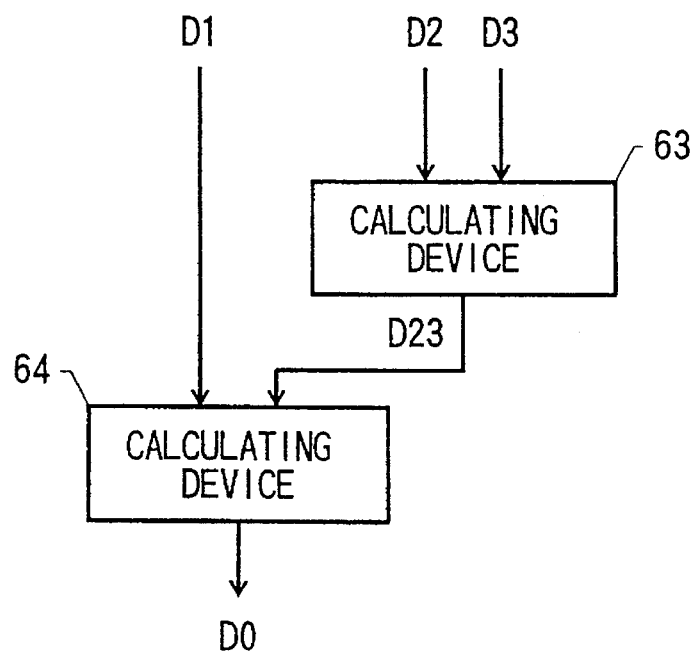
FIG. 18 is a block diagram showing a variation of a calculating device in the tenth embodiment of this invention.

A device shown in FIG. 18 is a variation of that in FIG. 17. In the device as a variation, the intermediate gray value D23 is firstly calculated from the second gray value D2 and the third gray value D3 in a calculating device 63. Then, the final composite gray value D0 is calculated from D23 output from the calculating device 63 and the first gray value D1. As a result, the final composite gray value D0 is output from the calculating device 64.

Example 11

The eleventh embodiment of this invention is related to a calculating device for a composite gray value D0 made of three or more steps of gray values. The more steps of exposure for picturing an object is used, the wider the dynamic range of the object expands and the more precise composite picture is obtained.

Figure 26:
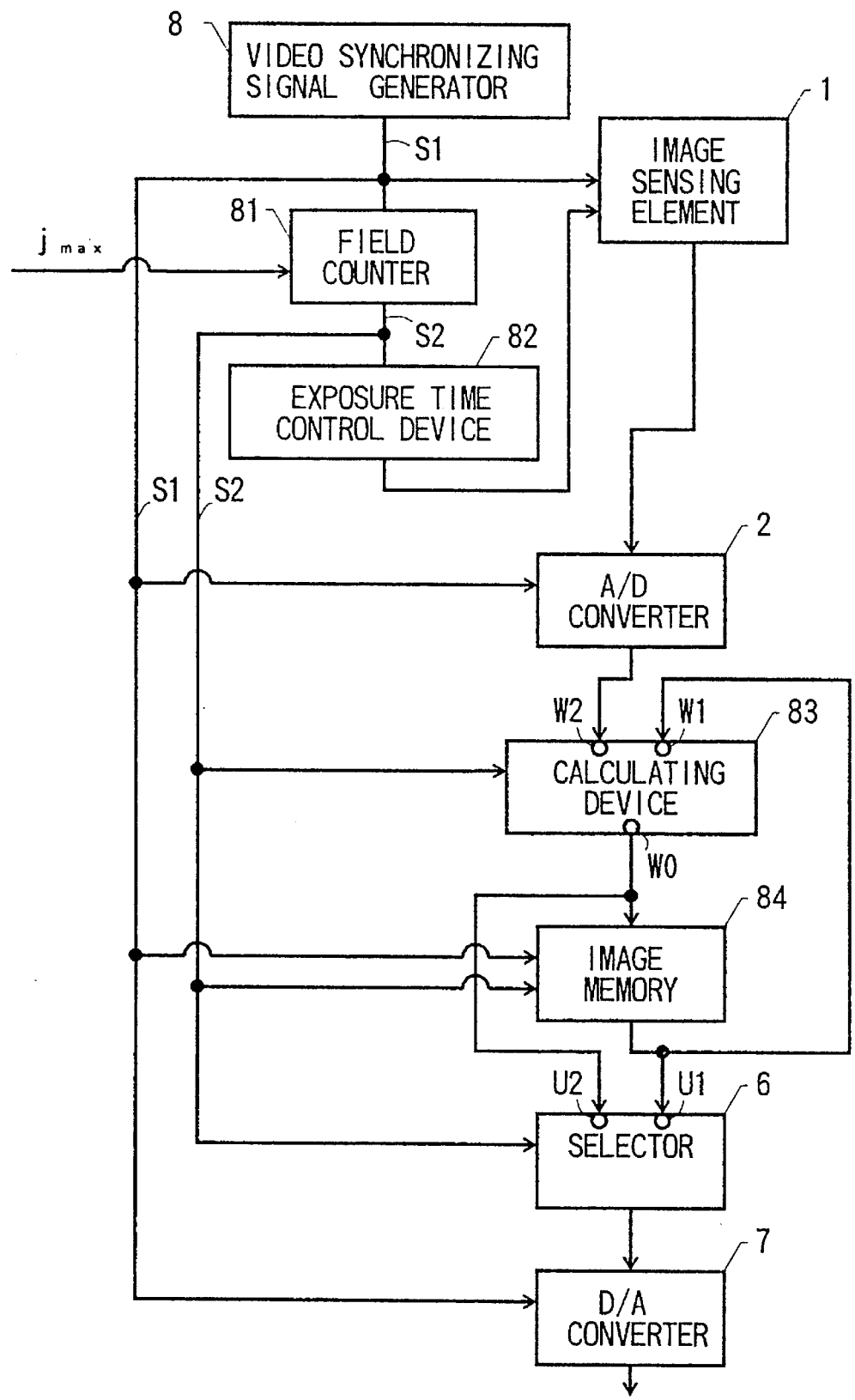
FIG. 26 is a block diagram showing the constitution of an image sensing device in the eleventh embodiment of this invention.

Referring to FIG. 26, the image sensing device comprises a video synchronizing signal generator 80, a field counter 81, and a exposure time control device 82. These three constituents function in the same way as the control device 8 in FIG. 1. The image sensing device in FIG. 26 further comprises an image sensing element 1, an A/D converter 2, a calculating device 83, an image memory 84, a selector 6, and a D/A converter 7.

The field counter 81 counts the number of time interval in a control period, or the number of fields, employing a signal S1 from the video synchronizing signal generator 80. When a counter value j exceeds a set value $j_{max}$, the counter value j is reset in zero. The exposure time control device 82 exposes the image sensing element 1 to light for the exposure time Tj+1 depending on the value j of a field judgment signal S2 output from the field counter 81. The value j is equal to an interval number m of the mth time interval except the last time interval. In the interval number $m_{max}$ of the last time interval, the value j of the field judgment signal S2 shows zero. A first input terminal 1 of the calculating device 83 is connected to the output of the image memory 84. A second input terminal W2 of the calculating device 83 is connected to the output of the A/D convertor 2. The calculating device 83 functions in basically the same way as the calculating device 3 in the first embodiment although the former changes coefficients and functions in Eq. 7 in the first embodiment depending on the value j of the field judgment signal S2.

Figure 27:
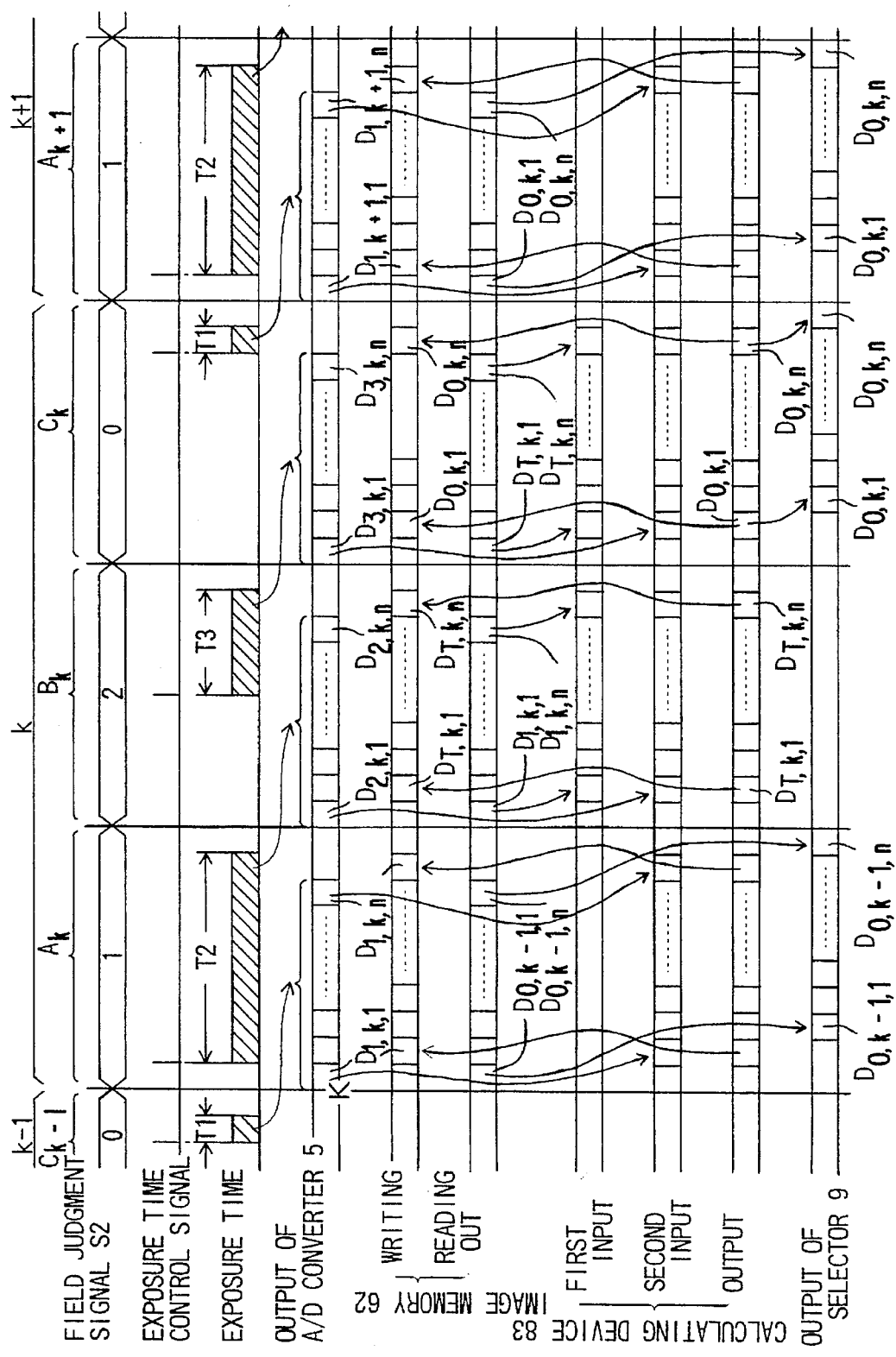
FIG. 27 is a timing chart explaining operation of the eleventh embodiment of this invention.

In the concrete, the calculating device 83 outputs the data as it is which is input through the second input terminal W2 in a first time interval $A_k$ in which the value j of the field judgment signal S2 shows one. In latter time intervals, the first time interval $B_k$, the second time interval $C_k$ ... in which the value j of the field judgment signal S2 shows other than one, the calculating device 83 combines a gray value read out from the image sensing element 1 in the current time interval and an intermediate composite gray value D0 calculated prior to the time interval. Although FIG. 27 shows only three time intervals, the number of time intervals, namely the number of exposure steps, could be arbitrary.

Therefore, in the mth time interval, the final composite gray value D0 is calculated from the first gray value D1 with the exposure time T1 to the mth gray value Dm with the exposure time Tm. The image memory 84 stores the intermediate composite gray values calculated from the first gray value D1 to the m–1th gray value Dm–1. In the last time interval $m_{max}$ (j=0), the final composite gray value is calculated from the first gray value D1 to the mth gray value $D_{max}$. The value is calculated by combining the intermediate composite gray value of the first gray value D1 to the $m_{max}$–1th gray value $Dm_{max}$– 1 with the $m_{max}$th gray value $Dm_{max}$, the former being stored in the image memory 84, the latter being read out from the image sensing element 1 in the current time interval.

Since in the first time interval $A_k$, the calculating device 83 directly outputs an output of the A/D converter 2 which is input through the second input terminal W2, the calculating device 83 functions in the same way as a selector 5 shown in FIG. 1 does.

The selector 6 outputs data input through the second input terminal U2, or an output from the calculating device 83, to the D/A converter 7 in the last time interval $m_{max}$ in which the value j of the field judgment signal S2 shows zero. In the first time interval $A_k$ in which the value of the field judgment signal S2 shows one, the selector 6 outputs an input data through first input terminal U1, or an output of the image memory 84, to the D/A converter 7. In other time intervals than the first and the last, the selector 6 does not output any values.

Operations of the image sensing element in this embodiment are explained with reference to FIG. 27. When there is two time intervals in one control period, or the value $j_{max}$ shows one, the operation becomes the same as that explained in the first and second embodiments. When there are three time intervals in one control period, or the value $j_{max}$ shows two, the operation of the device in the first, the second, and the last time interval are explained in the following paragraphs, respectively.

Operation in the First Time Interval $A_k$ of the kth Control Period

In the first time interval $A_k$ of the kth control period, the field judgment signal S2 shows one. The calculating device 83 is set in a mode to select the second input terminal W2 and outputs its input data to the image memory 84. The first gray value D1 is stored in the image memory 84. Further, the selector 6 is set in a mode to connect its first input terminal U1 with its output terminal. It enables the composite gray value D0 which is already calculated in the k–1th control period and is stored in the image memory 84 to be output to the D/A converter 7.

Namely, the composite gray values for each picture element $D_{0, k-1, 1}$; $D_{0, k-1, 2}$ ... $D_{0, k-1, n}$ calculated in the k–1th control period are successively read out from the respective addresses in the image memory 84 by each picture element. Then, those values are transferred to the D/A converter 7 through the selector 6, are transformed into an analog signal for each picture element, and are successively output as a video signal. The memory 84 is constituted so as to read out data prior to writing data into the addresses corresponding to each picture element in a similar way to the first embodiment of this invention.

Therefore, in this time interval $A_k$, the first gray values $D_{1, k, 1}, D_{1, k, 2}, \ldots \ldots D_{1, k, n}$ which are read out from the image sensing element 1, and are transformed into digital values by the A/D converter 2 are stored in each address corresponding to each picture element in the image memory 84 through the calculating devise 83.

While the first gray value D1 of the first picture is read out from the image sensing element 1 in the first time interval $A_k$, a second picture with exposure time T2 is being taken by the image sensing element 1.

Operation of the Second Time Interval $B_k$ of the kth Control Period

In the second time interval $B_k$ of the kth control period, the intermediate composite gray value D0 calculated by the calculating device 83 is successively stored in the image memory 84 for each picture element. The selector 6 is set in a mode to isolate the output from the input.

Further, in the second time interval $B_k$, the second gray values $D_{2, k, 1}, D_{2, k, 2}, \ldots D_{2, k, n}$ which are read out from the image sensing element 1 and transformed into digital values by the A/D converter 2 are repeatedly input to the calculating device 83 through the second input terminal W2 for each picture element. On the other hand, the first gray values $D_{1, k, 1}, D_{1, k, 2}, \ldots D_{1, k, n}$ stored in the image memory 84 during the first time interval $A_k$ are simultaneously read out synchronizing with the input of the second gray values for each picture element. Those read out values are successively input to the calculating device 83 through the first input terminal In the calculating device 83, the intermediate composite gray values are calculated based on the first gray values $D_{1, k, 1}, D_{1, k, 2}, \ldots D_{1, k, n}$ and the second gray values $D_{2, k, 1}, D_{2, k, 2}, \ldots D_{2, k, n}$ input through the first and second input terminals W1 and W2, respectively, and then are output to the image memory 84 through the output terminal W0 of the calculating device 83. Those output values are stored in the respective addresses corresponding to each picture element in the image memory 84. Such storing in the image memory 84 is designed to be carried out after the content of the each address is read out as described above.

Further, in the second time interval $B_k$, the image sensing element 1 takes the picture of the object for the exposure time T3. The obtained picture is read out from the image sensing element 1 in the next time interval.

Operation of the Intermediate Time Interval of the kth Control Period

In the intermediate time interval of the kth control period, the operation of the image sending device is the same as that in the second time interval $B_k$.

Operation of the Last Time Interval $C_k$ of the kth Control Period

In the last time interval $C_k$ of the kth time control period, the selector 6 is set in a mode to select the second input terminal U2, or to output the output data of the calculating device 83 to the D/A converter 7. Other than that, the operation in this period is the same as that in the second time interval $B_k$.

Thereafter the same operation as described from the first time interval $A_k$ to the last $C_k$ is repeatedly carried out in each corresponding time interval.

When it is required to freeze a picture for a purpose of image processing, the operation is suspended at the timing of the end of the last time interval where the counter value is zero. It enables the image memory 84 to freeze the picture with the expanded dynamic range all the time.

Example 12

In the eleventh embodiment, the selector 6 does not output a value in a time interval other than the first and last time intervals. Therefore, when a picture with an expanded dynamic range is monitored on a video display by a video signal converted in the D/A converter from an output from the selector 6, a problem arises that the video display is difficult to watch because the output thereof blinks. In order to solve this problem, the eleventh embodiment can be modified as described in the twelfth embodiment. The device is designed to change the number of time intervals in one control period at any points.

In the twelfth embodiment, the device in the eleventh embodiment is employed, too. Normally, the value $j_{max}$ of the field counter 81 usually shows one and the counter value repeatedly shows one or zero. During that period, the image sensing element 1 outputs a video signal of the composite picture by two time interval in the control period. This operation is the same as that of the first embodiment.

When a timing signal is given to the field counter 81, it resets the value $j_{max}$ at two and the counter value shows zero, one, and two. It means that the composite gray value is made of three gray values with three different exposure time T1, T2, and T3. During this period in which $j_{max}$ shows two, the image sensing element 1 outputs the video signal of the composite picture by three time intervals in a control period. As shown in FIG. 27, no video signals are output in the time interval $B_k$ when the value $j_{max}$ is set at two. However, the composite picture with better precision is stored in the image memory 84.

With such arrangement, the image sensing device in this twelveth embodiment can select the number of time intervals depending on necessity. Normally, the device makes the composite picture by two time intervals in the control period and enables to catch up the speed of the moving object. When the composite picture with better precision becomes necessary, the number of time intervals in the control period are changed into three by the command signal sacrificing processing time a little even after photographing begins.

As an example, the value $j_{max}$ of the field counter 81 is set at two in this embodiment. Alternatively, the value $j_{max}$ can be set more than 2.

Example 13

Figure 28:
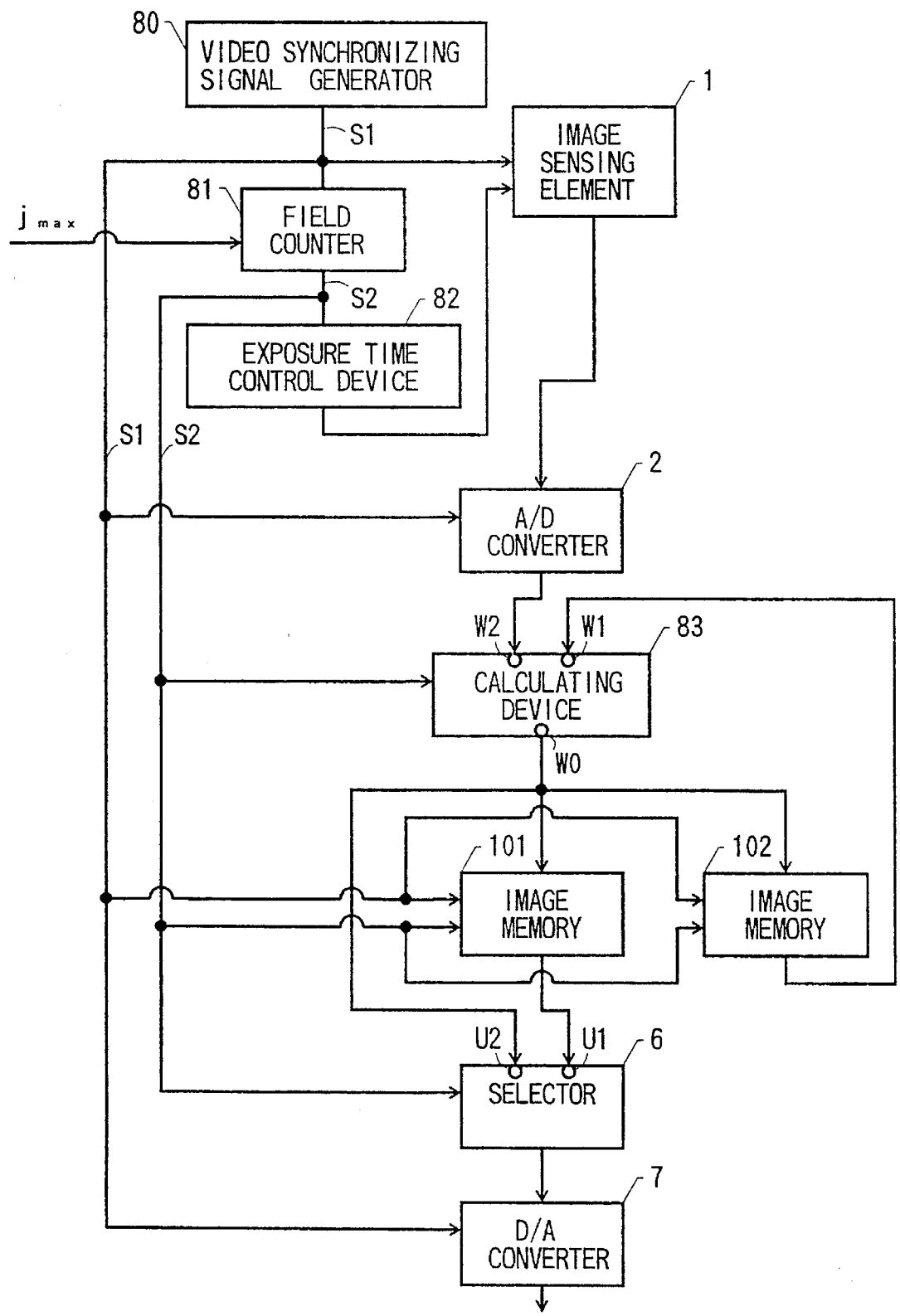
FIG. 28 is a block diagram showing the constitution of an image sensing device in the thirteenth embodiment of this invention.

FIG. 28 shows the thirteenth embodiment of this invention. The image memory 84 employed in the former embodiments is replaced by two image memories 101 and 102 which are arranged in parallel. Other constituents of this embodiment are the same as those of the eleventh and the twelfth embodiments. When the value $j_{max}$ are set at two or more in the eleventh embodiment, video signals can be output only in the first time interval and the last time interval in which the value of field judgment signal shows zero or one. In this embodiment, the image sensing device is designed to output a video signal of the composite gray value in each time interval.

Figure 29:
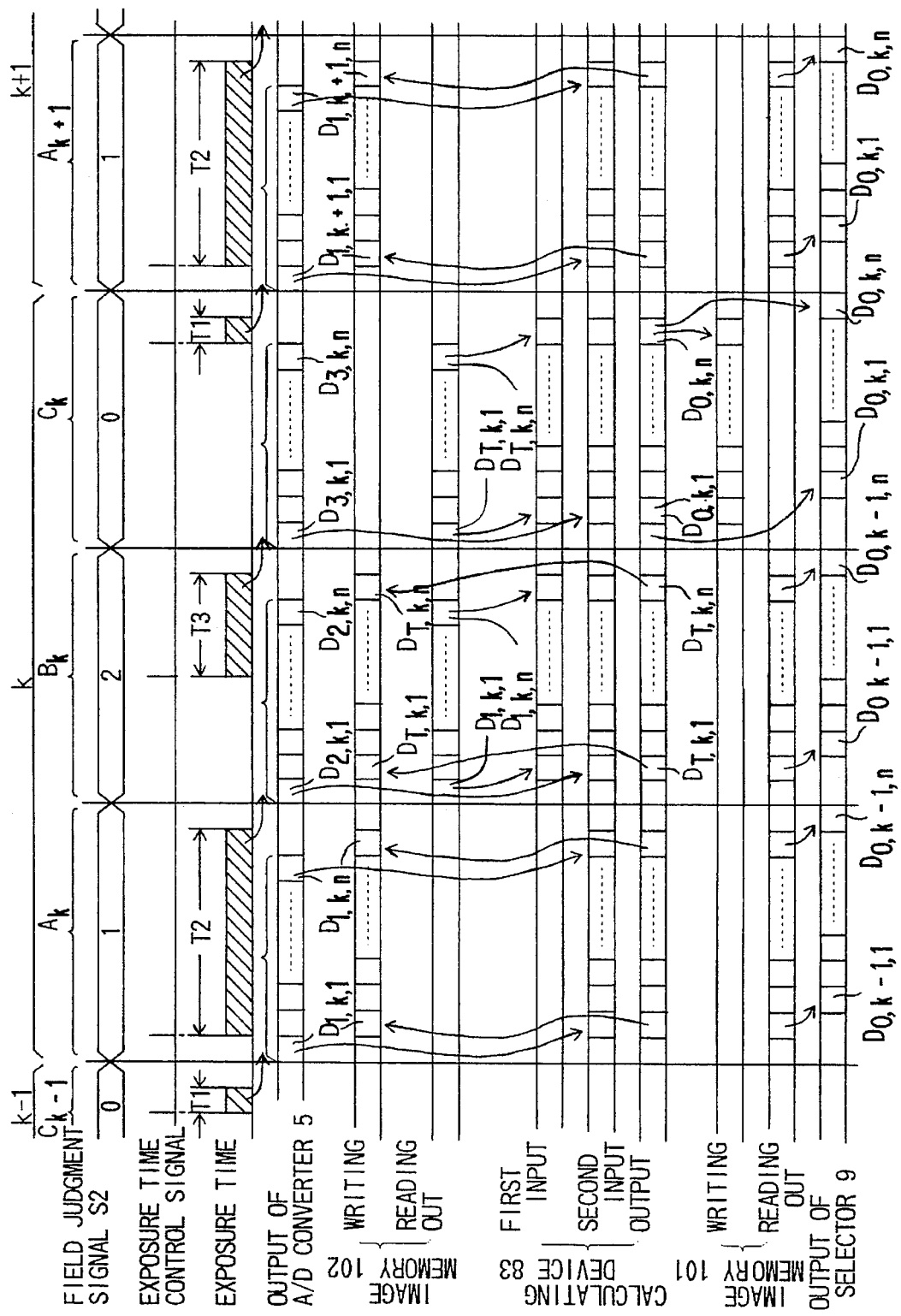
FIG. 29 is a timing chart explaining operation of the thirteenth embodiment of this invention.

The image memory 101 stores the composite picture with an expanded dynamic range, or the final composite gray value D0. The image memory 102 functions in the same way as the image memory 84 in the eleventh embodiment except that the image memory 102 does not output data to the selector 6. Namely, the image memory 102 stores a first gray value D1 and an intermediate composite gray values DT. The function of a video synchronizing signal generator 80, a field counter 81, an exposure time control device 82, an image sensing element 1, an A/D convertor 2, and a calculating device 83 is the same as that of constituents in the eleventh embodiment. As shown in FIG. 29, the image memory 101 stores a final composite gray value D0 calculated by the calculating device 83 in the last time interval when the field judgment signal S2 shows zero. The image memory 101 outputs the final composite gray value D0 of the prior control period stored therein to the selector 6 in any time intervals but the last time interval when the field judgment signal S2 shows other than zero. The selector 6 outputs the final composite gray value D0 of the preceding control period, which is stored in the image memory 101, to the D/A converter 7 in any time intervals except the last. In the last time interval, the selector 6 outputs the final composite gray value D0 of this control period, which is calculated by the calculating device 83, to the D/A converter 7. With such arrangement, a video signal of the composite gray value D0 is obtained in each time interval.

In the last time interval in which the field judgment signal S2 shows zero, the calculating device 83 outputs the final composite gray value D0 combining all gray values D1 to $Dj_{max}+1$ taken with the exposure time T1 to $Tj_{max}+1$. The gray value D0 is output to the D/A converter 7 through the selector 6 and also stored in the image memory 101.

In other time intervals except the last time interval in which the field judgment signal S2 shows other than zero, the calculating device 83 outputs a renewed intermediate composite gray value, which is calculated from the intermediate composite gray value DT stored in the image memory 102 and the gray value output in the current time interval from the image sensing element 1, to the image memory 102 and then the renewed gray value is stored therein.

Example 14

Figure 30:
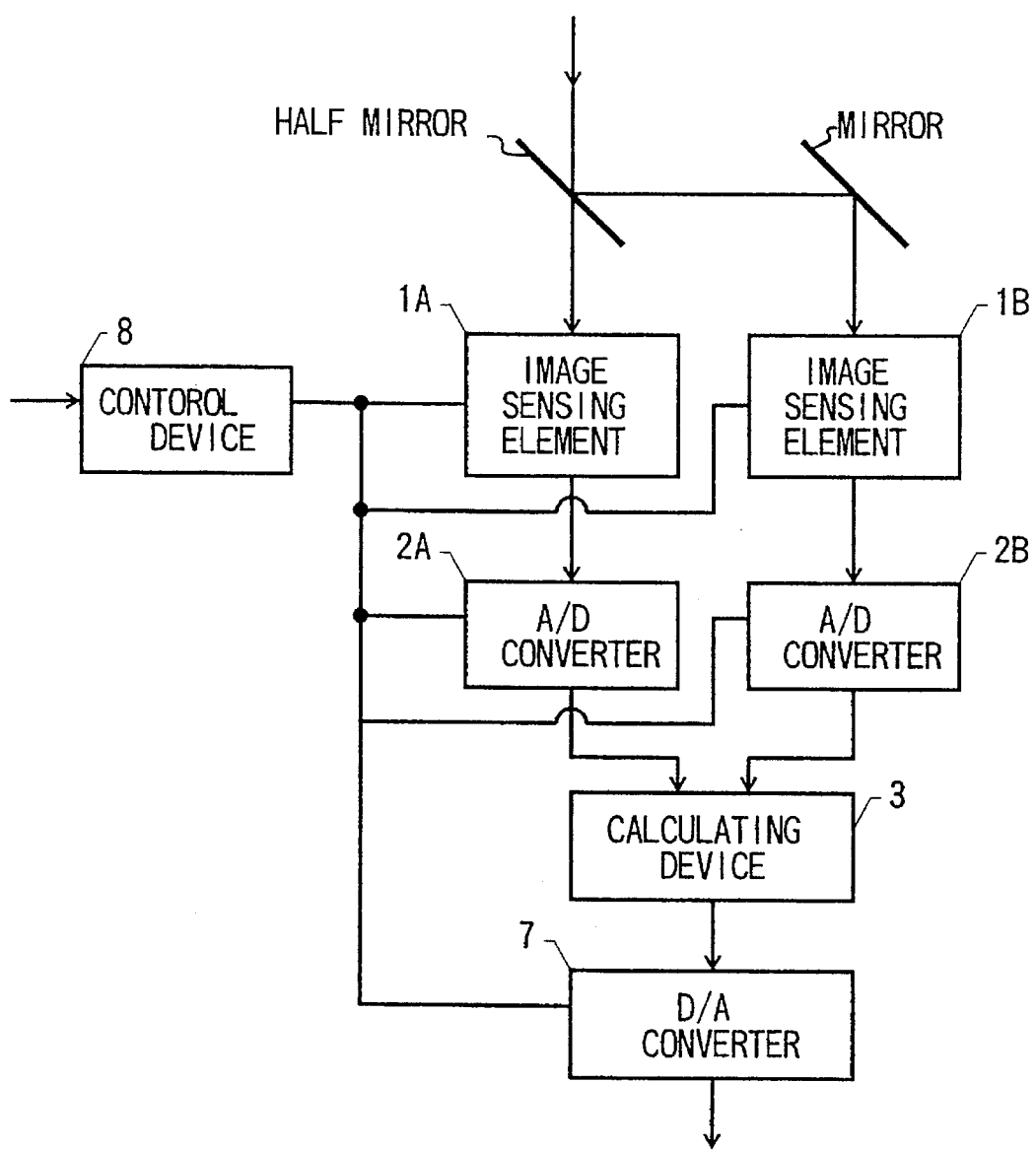
FIG. 30 is a block diagram showing the constitution of an image sensing device in the fourteenth embodiment of this invention.

In the first to the thirteenth embodiments, an image sensing element takes plural pictures with different exposures at steps. It is possible to install plural image sensing elements in an image sensing device for obtaining plural pictures with different exposures in order. Two image sensing elements are installed in the fourteenth embodiment. As shown in FIG. 30, the image sensing device in this embodiment comprises two image sensing elements 1A and 1B, two A/D converters 2A and 2B, a calculating device 3, a D/A converter 7, and a control device 8. Those constituents except the control device 8 function in the same way as those in the first embodiment. An incident ray is divided into two by a half mirror and they are projected on the receiving planes of 1A and 1B, respectively. Thus, first and second pictures of gray values D1 and D2 with the exposure time T1 and T2 are obtained by the image sensing elements 1A and 1B, respectively.

Figure 31:
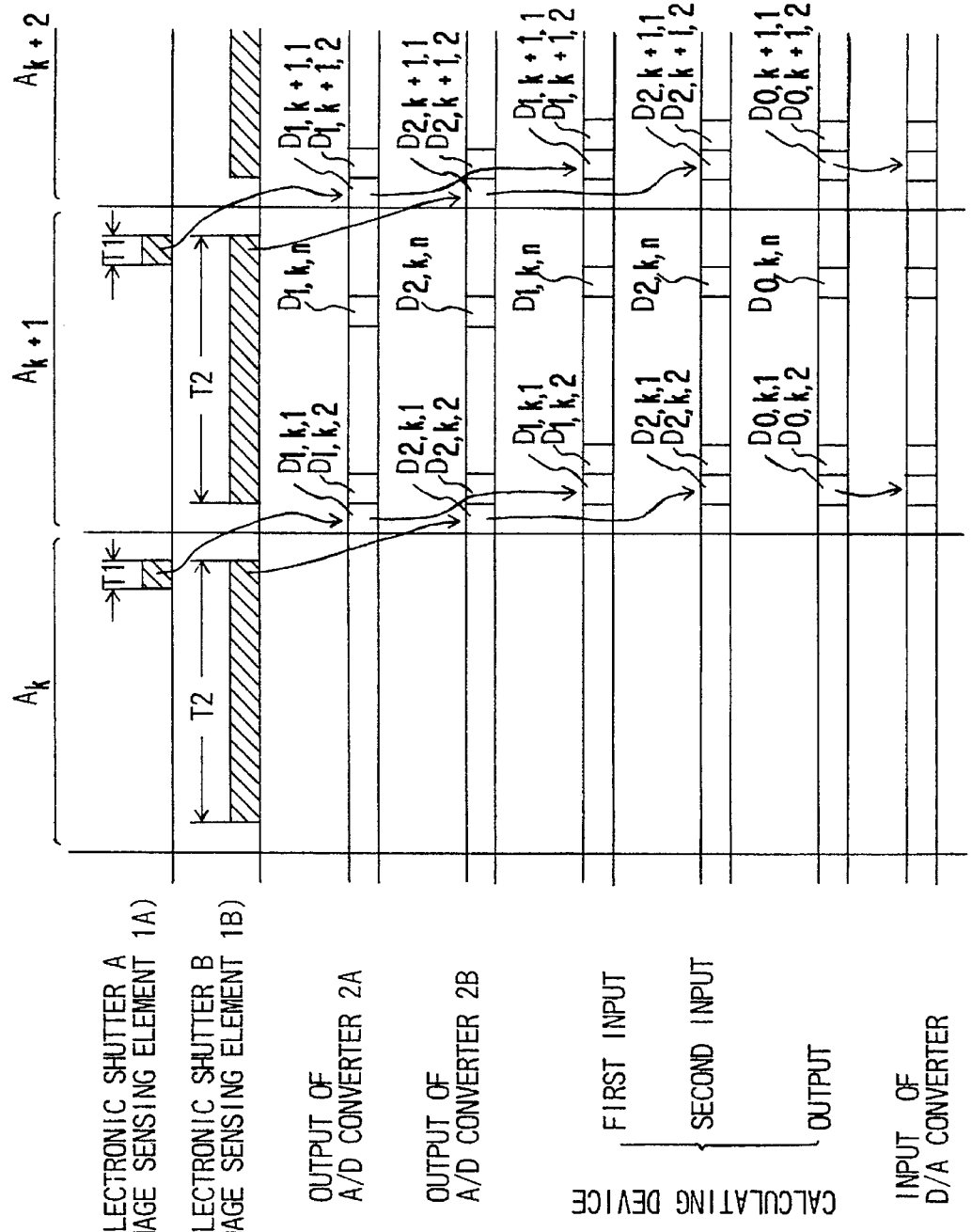
FIG. 31 is a timing chart explaining operation of the fourteenth embodiment of this invention.
Figure 32:
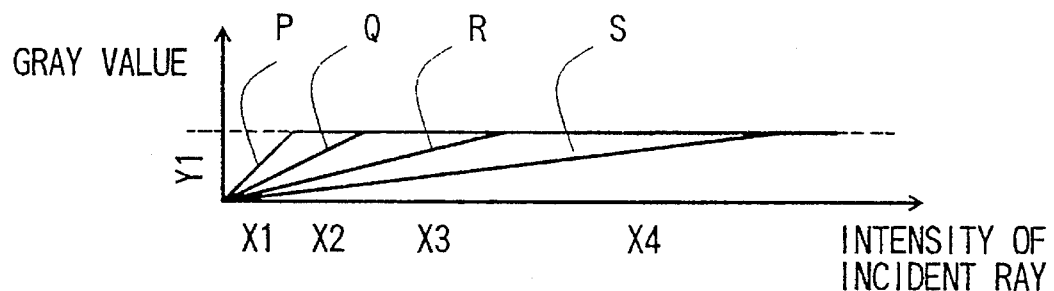
FIGS. 32(a) and 32(b) are characteristic figures showing the relation between each gray value and that with an expanded dynamic range.
Figure 32:
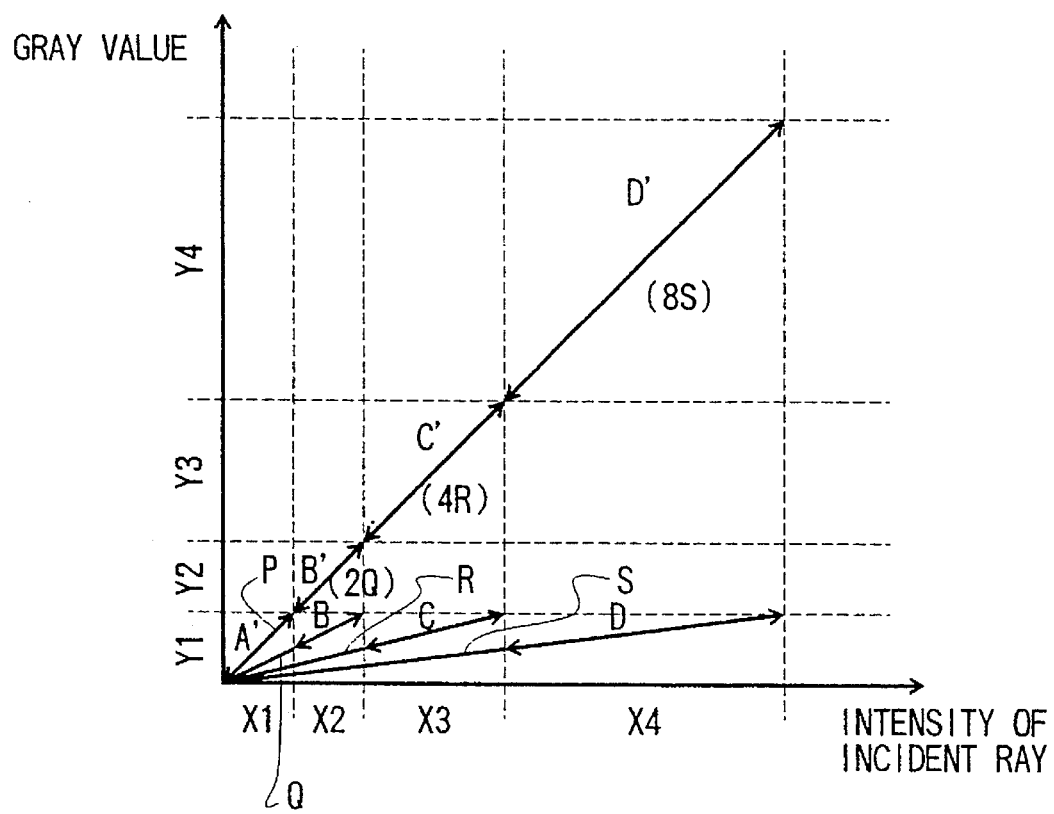
Figure 33:
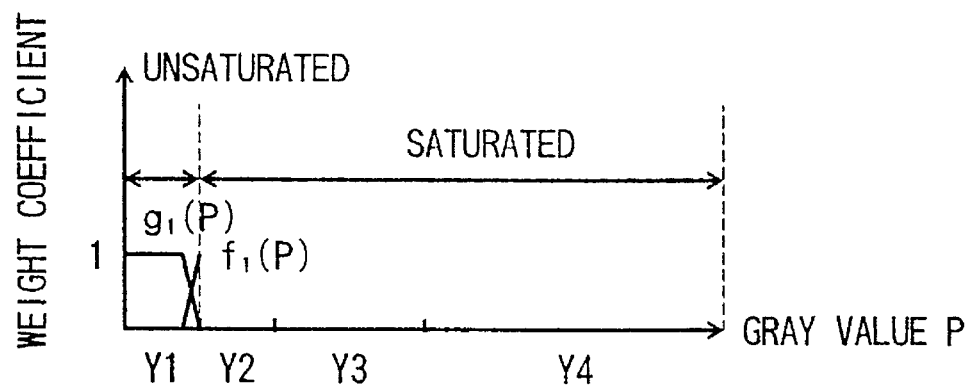
FIGS. 33(a) to 33(c) are characteristic figures of functions of weight coefficients.
Figure 33:
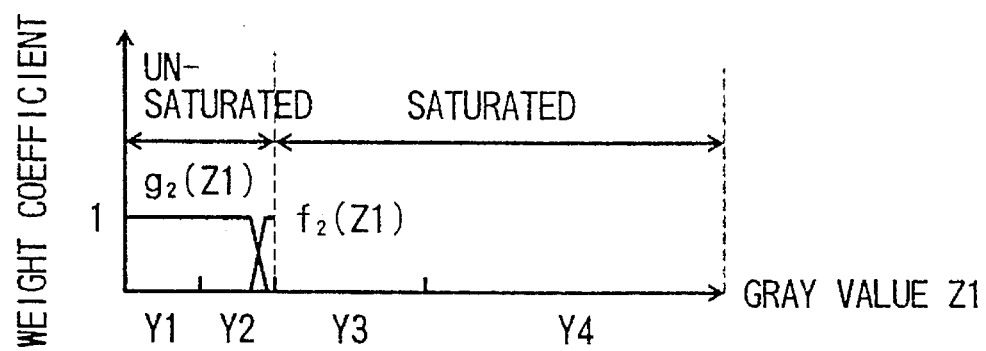
Figure 33:
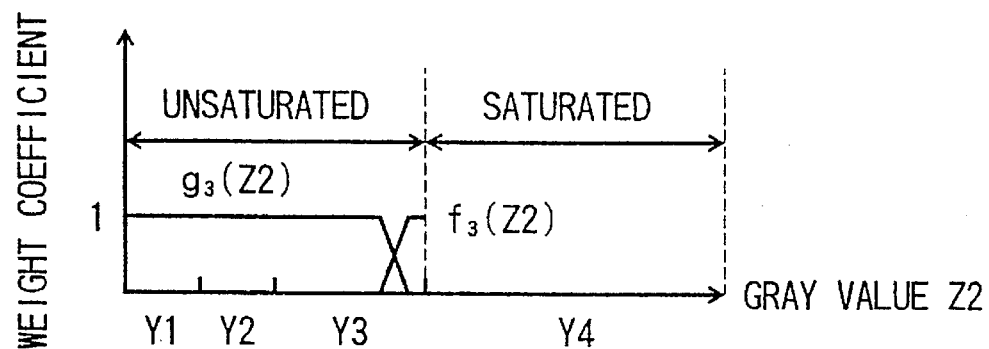
Figure 34:
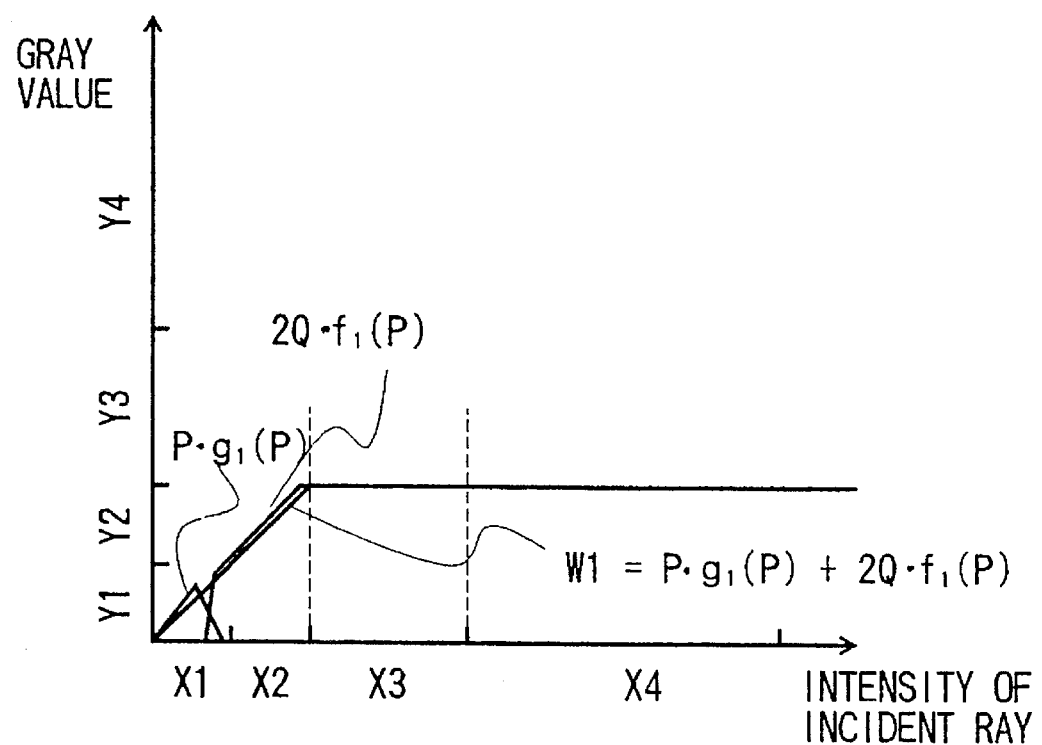
FIG. 34 is an explanatory figure of a means to combine gray values.
Figure 35:
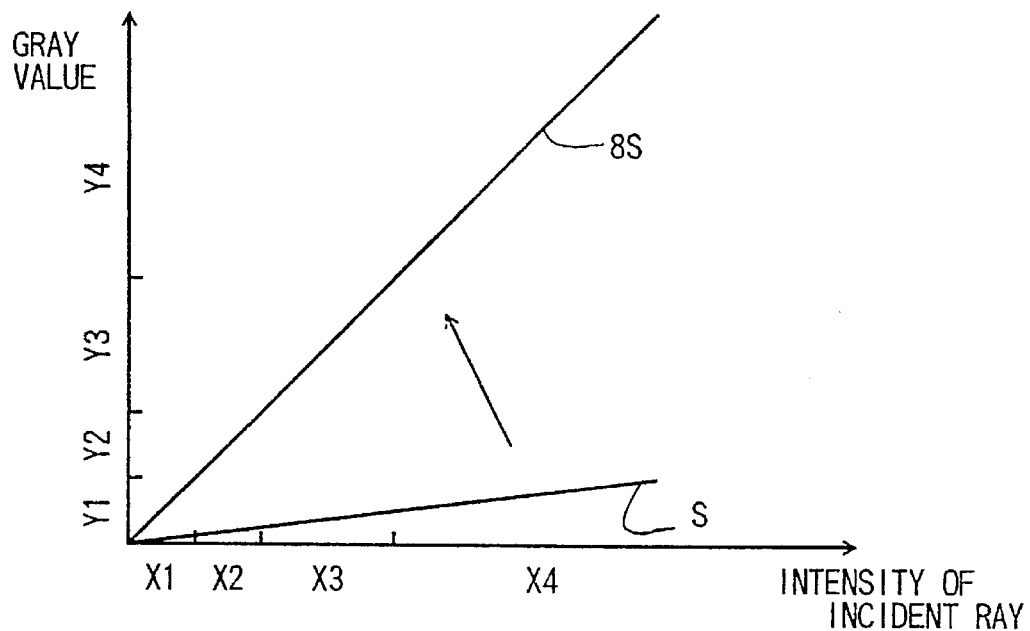
FIGS. 35(a) and 35(b) are explanatory figures of another means to combine gray values.
Figure 35:
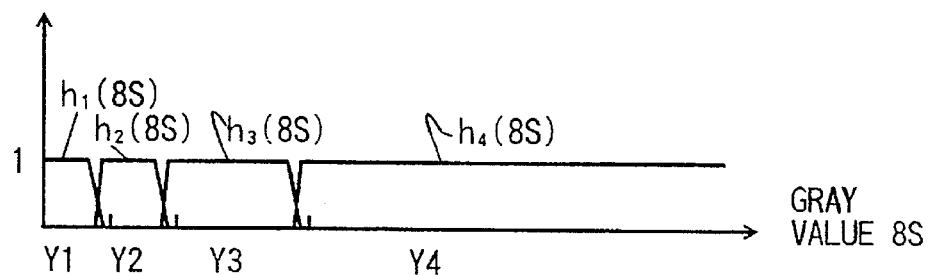

The device in FIG. 30 is controlled by the control device 8 as shown in FIG. 31. In a first time interval, the two image sensing elements 1A and 1B are exposed with light for T1 and T2, respectively, and the obtained gray values D1 and D2 are simultaneously read out in the next time interval $A_{k+1}$. D1 which is output by the image sensing element 1A is transmitted to a first input terminal of the calculating device 3. D2 which is output by the image sensing element 1B is transmitted to a second input terminal of the calculating device 3. Then the calculating device 3 calculates and outputs a composite gray value D0 to the D/A converter 7.

Although the image sensing device in the fourteenth embodiment requires two sets of the image sensing element and the A/D converter, the device is still advantageous in two points. First, the device in this embodiment can take pictures faster than a device in which an image sensing element exposes twice. Second, no image memories are necessary since taking first and second pictures is carried out simultaneously.

In the fourteenth embodiment, the half mirror is employed to divide the incident ray into two and two image sensing elements takes two pictures using the two rays. Alternatively, photosensitive cells to be exposed for T1 and T2 can be alternately installed over every other picture element on the image sensing element to obtain two pictures. Concretely, the exposure can be varied, for each picture element, by varying charge storage time varying the receiving plane of photoelectronic transfer cells, or providing a filter for reducing light in the front part of the photoelectronic transfer cells. With such arrangement, the conventional image sensing device cannot prevent a positional shift of the picture element between a first picture and a second picture. In this invention, however, the influence of such positional shift is mitigated. Further alternatively, the area of active collection region for each photosensitive cell can be changed for the exposure time T1 and T2. As an example, when the area of the cell for T1 is n times as large as that for T2, a cell for T1 is exposed not for T1 but for T1/n.

What is claimed is:

1. An image sensing device to obtain a composite picture with an expanded dynamic range by combining plural pictures with different exposures comprising:

at least one image sensing element which photographs an object with at least two different exposures;

a control device for changing said exposures to said image sensing element at n steps (n≧2, integer) and controlling said image sensing element to output n sets of pictures taken with said n steps of exposures; and a calculating device for creating said composite picture with said expanded dynamic range, by combining first and second pictures taken with consecutive two exposures out of said n steps of exposures, said second picture being taken with a larger exposure than said first picture; wherein said calculating device creates an intermediate composite picture with an intermediate expanded dynamic range by calculating a gray value of said second picture in a saturation region thereof based on a gray value of said first picture, utilizing the two gray values of said first and second pictures and two weight coefficients, said two weight coefficients being decided by said gray value of one of said first and second pictures, thereby reducing n sets of pictures to n−1 sets; and said control device repeats the proceeding process with respect to said n−1 sets of pictures to obtain a final composite picture with the most expanded dynamic range.

2. The image sensing device according to claim 1, wherein said calculating device comprises:

first and second function generators for generating first and second weight coefficients corresponding to said gray value of said second picture;

a first multiplier for multiplying said gray value of said first picture by said first weight coefficient output from said first function generator;

a second multiplier for multiplying said gray value of said second picture by said second weight coefficient output from said second function generator; and an adder for summing up outputs of said first and second calculating means; and said control device controls said first and second function generators, said first and second multipliers and said adder and outputs an output of said adder for each picture element corresponding to said first and second pictures based on said gray values of said first and second pictures.

3. The image sensing device according to claim 1 wherein said number of steps of exposures is two.

4. The image sensing device according to claim 1 wherein said image sensing device comprises n image sensing elements corresponding to diverse steps of exposures and each of said n image sensing elements photographs a picture corresponding to exposure at n steps at one time.

5. The image sensing device according to claim 1 wherein said image sensing element comprises one element and said control device photographs an object with altering exposures at discrete n steps and outputs an image data photographed with mth (m is integer) exposure from said image sensing element in a mth time interval.

6. The image sensing device according to claim 1 wherein said gray values for deciding said two weight coefficients are gray values of said second picture.

7. The image sensing device according to claim 1, wherein said calculating device further comprises a look up table inputting said first and second pictures and outputting said composite picture.

8. An image sensing device to obtain a composite picture with an expanded dynamic range by combining plural pictures with different exposures comprising:

at least one image sensing element which photographs an object with at least two different exposures;

a control device for changing said exposures to said image sensing element at n steps ($n \geq 2$, integer) and controlling said image sensing element to output n sets of pictures taken with said n steps of exposures;

multiplying means for multiplying each gray value of said n sets of pictures by each weight coefficient decided by n sets of functions with respect to a first gray value of a first picture taken with the smallest exposure, respectively; and an adder for summing up said each gray value weighted by said multiplying means;

wherein said control device controls said multiplying means and said adder and outputs a result of said adder as said composite picture with said expanded dynamic range based on said each gray value of said n sets of pictures, for each picture element corresponding to said n sets of pictures.

9. The image sensing device according to claim 8 wherein said calculating device comprises n function generators for generating values for each of n sets of function with respect to said first gray value of said first picture, each value being output by said function generators; and n multipliers for respectively multiplying each of said values output by said function generators by each gray value of said n sets of pictures.

* * * * *